(12) United States Patent
Zhang et al.

(10) Patent No.: US 7,840,618 B2
(45) Date of Patent: Nov. 23, 2010

(54) WIDE AREA NETWORKED FILE SYSTEM

(75) Inventors: Hui Zhang, New Brunswick, NJ (US); Aniruddha Bohra, Edison, NJ (US); Samrat Ganguly, Monmouth Junction, NJ (US); Rauf Izmailov, Plainsboro, NJ (US); Jian Liang, Brooklyn, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 300 days.

(21) Appl. No.: 11/616,925

(22) Filed: Dec. 28, 2006

(65) Prior Publication Data

US 2007/0162462 A1    Jul. 12, 2007

Related U.S. Application Data

(60) Provisional application No. 60/743,091, filed on Jan. 3, 2006.

(51) Int. Cl.
*G06F 17/30* (2006.01)

(52) U.S. Cl. ............... 707/827; 711/154; 711/155; 711/156

(58) Field of Classification Search ............ None
See application file for complete search history.

(56) References Cited

U.S. PATENT DOCUMENTS 6,405,201 B1 * 6/2002 Nazari ..................... 1/1

| | | | |
|---|---|---|---|
| 2002/0064149 A1 * | 5/2002 | Elliott et al. | 370/352 |
| 2003/0217234 A1 * | 11/2003 | Rowlands | 711/141 |
| 2004/0172421 A1 * | 9/2004 | Saito et al. | 707/200 |
| 2006/0129537 A1 * | 6/2006 | Torii et al. | 707/3 |

* cited by examiner

*Primary Examiner*—Apu M Mofiz
*Assistant Examiner*—Anteneh Girma
(74) *Attorney, Agent, or Firm*—Joseph Kolodka

(57) ABSTRACT

Traditional networked file systems like NFS do not extend to wide-area due to network latency and dynamics introduced in the WAN environment. To address that problem, a wide-area networked file system is based on a traditional networked file system (NFS/CIFS) and extends to the WAN environment by introducing a file redirector infrastructure residing between the central file server and clients. The file redirector infrastructure is invisible to both the central server and clients so that the change to NFS is minimal. That minimizes the interruption to the existing file service when deploying WireFS on top of NFS. The system includes an architecture for an enterprise-wide read/write wide area network file system, protocols and data structures for metadata and data management in this system, algorithms for history based prefetching for access latency minimization in metadata operations, and a distributed randomized algorithm for the implementation of global LRU cache replacement scheme.

6 Claims, 28 Drawing Sheets

Fig. 12

| rpc methods | # of access (14 days) | % of RPC methods |
|---|---|---|
| read | 194,404,998 | 50.68 |
| write | 64,635,756 | 16.85 |
| getattr | 89,051,316 | 23.22 |
| lookup | 18,442,927 | 4.81 |
| access | 6,464,648 | 1.69 |
| remove | 3,234,284 | 0.84 |
| setattr | 3,090,839 | 0.81 |
| readdirplus | 1,448,400 | 0.38 |
| statfs | 910,257 | 0.24 |
| readdir | 692,763 | 0.18 |
| link | 474,079 | 0.12 |
| rmdir | 265,733 | 0.07 |
| fsinfo | 131,104 | 0.03 |
| readlink | 125,584 | 0.03 |
| rename | 86,367 | 0.02 |
| mkdir | 55,659 | 0.01 |
| pathconf | 30,478 | 0.01 |
| symlink | 11,872 | 0.003 |
| nothing | 4,361 | 0.001 |
| mknod | 7 | 1.825E-06 |
| commit | 0 | 0 |
| total | 383,561,432 | 100 |

Fig. 13

| NFS client/server | Planetlab node | Time Zone |
|---|---|---|
| Site0 | planetlab1.cs.uit.no. | GMT -1h |
| Site1 | planetlab-1.stanford.edu. | GMT +8h |
| Site2 | planetlab1.informatik.uni-kl.de. | GMT -1h |
| Site3 | planetlab2.pop-rs.rnp.br. | GMT +3h |
| Site4 | planetlab1.eecs.umich.edu. | GMT +5h |
| Site5 | planetlab1.cs.wayne.edu. | GMT +5h |
| Site6 | planetlab2.cs.unibo.it. | GMT -1h |
| Site7 | planetlab1.cs.ucla.edu | GMT +8h |
| Site8 | planetlab2.cs.duke.edu. | GMT +5h |
| Site9 | csplanetlab2.kaist.ac.kr | GMT -9h |
| NFS server | planetlab-1.cs.colostate.edu | GMT +7h |

WIDE AREA NETWORKED FILE SYSTEM

CLAIM OF PRIORITY

This application claims priority to, and incorporates by reference herein in its entirety, pending U.S. Provisional Patent Application Ser. No. 60/743,091, filed Jan. 3, 2006, and entitled "The Design of a Wide Area Networked File System."

FIELD OF THE INVENTION

The present invention relates generally to storing and accessing data in a wide area network. More specifically, the invention is a system and technique for metadata and data file management using distributed proxy servers to overcome the otherwise high access latency of a wide area network file system architecture.

BACKGROUND OF THE INVENTION

A large number of enterprises today have multiple satellite offices. With increasing globalization, those locations span multiple time zones, range from small offices of less than twenty users, to large facilities of several thousand users. Recently, there has been a move towards centralized data management for such enterprises. Centralizing data resources leads to reduced infrastructure and personnel cost at satellite locations (clients), and resource consolidation at the data center (server) side. Data centers typically employ well trained professionals, have better recovery and disaster management support, and can provide centralized policy enforcement.

Deployment of such data management architecture for remote backups and disaster recovery is common. There is, however, a need for a network file system for interactive read-write data access in the wide area network (WAN) setting. Traditionally, network file systems have been designed for local area networks, where bandwidth is ample and latencies are low. Common networked file systems like NFS and CIFS transfer large amounts of data frequently. All writes are transmitted to the server and require synchronous updates to the files there. Apart from wasting bandwidth, typical networked file systems require multiple round trips to complete a single file operation. The metadata requests are synchronous and the client cannot proceed without receiving a server response. The high latency of the round-trips over the WAN and the "chatty" nature of the protocols make file access slow and unreliable. Finally, relying on a central server over the wide area network makes the file system susceptible to significant slowdowns due to unpredictable network delays and outages.

Networked file systems have been an active area of research. In an early system, clients transmitted all system calls, e.g. open, close, read, write, etc., to the server. Network file systems have been studied in the local area with stateless and stateful servers. Recently, there has been significant research activity in providing data access (object or file system based) over the WAN. Multiple peer-to-peer architectures for decentralized data management have been proposed. The goal of such systems, however, is to store large quantities of data, dispersed and replicated across multiple clients to improve fault resilience and reduce management overheads. In contrast, the systems and methods of the present invention improve performance of existing network file systems for interactive workloads. While a system of the present invention is capable of storing large data, replication, and disconnected operation, such characteristics are not the primary concern.

Independently, improving the performance of large file downloads in overlay networks has also been studied. Those systems target client downloads of whole data objects like movies, software distributions, etc., from one or more publishers. They do not maintain object hierarchies like directories, and do not consider modifications to objects. An entirely different workload is targeted by the system of the present invention. For example, the table of FIG. 12 shows the distribution of the different NFS RPC calls in a trace collected in an existing system. From the distribution of the RPC calls, it is clear that a significant portion of the network communication is due to the lookups and other metadata traffic. In a WAN environment, such communication imposes a significant overhead on the performance of the file system. Previous efforts to provide wide area file system access optimize mainly for the bandwidth. Reducing the latency of those metadata transfers is a primary design goal of the present invention in addition to providing high-bandwidth parallel downloads.

Using interposing proxies along with caching and parallel downloads, the systems described by A. Muthitacharoen, B. Chen, and D. Mazieres, *A Low-Bandwidth Network File System*, in SOSP '01: Proceedings of the Eighteenth ACM Symposium on Operating Systems Principles, pages 174-187, 2001, and by S. Annapureddy, M. J. Freedman, and D. Mazieres, *Shark: Scaling File Servers via Cooperative Caching*, in Proc. of 2nd Usenix Symposium on Network Systems Design and Implementation NSDI '05, Boston, Mass., May 2005, have been shown to reduce the bandwidth utilization of file system transfers. However, the techniques described target only data transfers, and are either specific to a single client-server pair or do not directly enable sharing across multiple client sites. The former system is primarily designed for a single client-server pair. The size of the content cache and the eviction policy do not significantly hinder performance. The latter uses geographically distributed cooperative caching proxies that enable fast parallel downloads in addition to difference elimination and content caching. That system is designed for environments where multiple clients are interested in the same large file concurrently; e.g., for an experiment. Therefore, no attempt to improve the metadata access performance as well as inter-site read-write sharing is explored.

There is therefore presently a need to provide a high-speed networking solution for WAN-based file system architecture. To the inventors' knowledge, no such solutions are currently available.

SUMMARY OF THE INVENTION

The present invention is a distributed file system that makes remote file access practical over the wide area. The invention is based on the client-server architecture of modern networked file systems (NFS/CIFS) and extends it to the WAN environment by introducing a file redirector infrastructure. That infrastructure resides between the central file server and clients, and effectively eliminates the overheads of repeated round-trips over the wide area networks and alleviates the bottleneck at the central server.

In one embodiment of the invention, a method is provided for storing and retrieving electronic files on a wide area network. At a first file system redirector, a request to retrieve a file is received, the request being from a client associated with the file system redirector. Also at the first file system redirector, attributes of the file are retrieved from a home file system redirector performing a home node function for the file. The home node function includes providing a serialization point for file updates and providing updates of the file to a file system manager. The file is retrieved at the first file system redirector using the retrieved file attributes, and the home node function is migrated from the home file system redirector to another file system redirector.

The method may further include the step of, at a file system redirector which is performing a home node function of a retrieved file, dividing the file into chunks, wherein the attributes of the file include a list of the chunks and locations of the chunks. The step of dividing the file into chunks may include hashing the file content using a collision resistant hash function. The step of dividing the file into chunks may further include enforcing a configurable upper bound on chunk length. The method may further include the step of storing the chunks in cache nodes on the wide area network.

The home node function may further include maintaining a consistent view of the file, or generating the file attributes.

The method may further comprise the steps of, at the home file system redirector, receiving from a requesting redirector a request to modify contents of the file, and granting exclusive update access to the requesting redirector. In that case, the home file system may periodically receive an update log containing file updates performed by the requesting redirector.

The step of migrating the home node function may further comprise selecting a new home node based on redirectors' frequency of access of the file over a certain time interval. The selecting step may further be based on network latencies between file system redirectors and a directory node of the file.

A home migration table administered by the file system manger may have a limited table size, and the selecting step may further comprise the following steps performed by the file system manager: starting from a root directory node in a file directory tree, deciding a home node for each directory node a based on redirectors' total access frequency to a subtree rooted at a; and for a home node assignment order, following breadth-first searching on the directory tree, and using a dynamic programming algorithm to pick an optimal assignment solution.

Alternatively, the selecting step may further comprises the following steps performed by the file system manager:

creating for each node $D_x$ in a directory tree, a stack of n registers $\{C_{D,R_j}, i \in [0,n]\}$ recording the expected access times of each WFSR on $D_x$ during the next time period, wherein $R_j$ is a file system redirector;

(i) for each directory node $D_x$, labeling a home node which minimizes the total access cost on $D_x$ as $H(D_x)$, and assigning $D_x$ the weight $W(D_x)$ as $(\Sigma_{j=0}^{n} C_{D,R_j} L_{R_j,H(D_x)} + M_{D,H(D_x)})$, wherein $L_{R_j,H(D_x)}$ is a network latency between $R_j$ and $H(D_x)$, and $M_{D,H(D_x)}$ is a transfer cost of migrating $D_x$ from a current home node to $H(D_x)$;

(ii) initializing a migration table with one entry recording a home node $R_0$ for the root directory, the migration table having a maximum number of entries;

(iii) placing all nodes into a linked list in descending order of weight $W(D_x)$;

(iv) repeating the following steps until either all migration table entries are filled or the ordered list is empty:

removing a head node in the ordered list, placing the head node into the migration table and assigning the head node to $H(D_x)$, the placing and assigning being performed only if a closest parent node of the head node in the migration table is not assigned to a same node as $H(D_x)$;

if a new node $D_x$ is put into the migration table, removing an immediate successor node of $D_x$ in the migration table if its assigned home node is the same as $H(D_x)$; and (v) for any node $D_x$ not in the migration table, assigning a home node equal to the home node assigned to the closest parent node on the directory tree.

The selecting step may further comprise transferring metadata and home node functions of the file to the new home node, based on a migration table of the file system manger.

The method may further include the step of caching the retrieved file in a cache memory associated with at least one file system redirector. The embodiment including the caching step may further include the steps of, in the at least one file system redirector, decomposing the file into m chunks; evenly dividing the m chunks into K bins; in a file system redirector performing a home node for the file, choosing a hosting file system redirector for each bin using a random mapping technique; inserting each bin into the chosen hosing file system redirector's cache memory along with a latest access time stamp of that file; and, at each hosting cache disk, updating its local queue using a Least Recently Used scheme, with an update unit in bins.

The step of decomposing the file into m chunks may further comprise enforcing a configurable upper bound on the chunk length to prevent the chunks from being too large.

For file atomicity maintenance, the method including the caching step may further include the step of evicting from the system all bins of a file is the file has a bin evicted during the process.

In another embodiment of the invention, a computer-usable medium is provided having computer readable instructions stored thereon for execution by a processor. The instructions perform the method described above.

BRIEF DESCRIPTION OF THE DRAWINGS

FIG. 12 is a table showing sample access data used for evaluating the system of the present invention.

FIG. 13 is a table showing characteristics of a network used for evaluating the system of the present invention.

DESCRIPTION OF THE INVENTION

Figure 1:
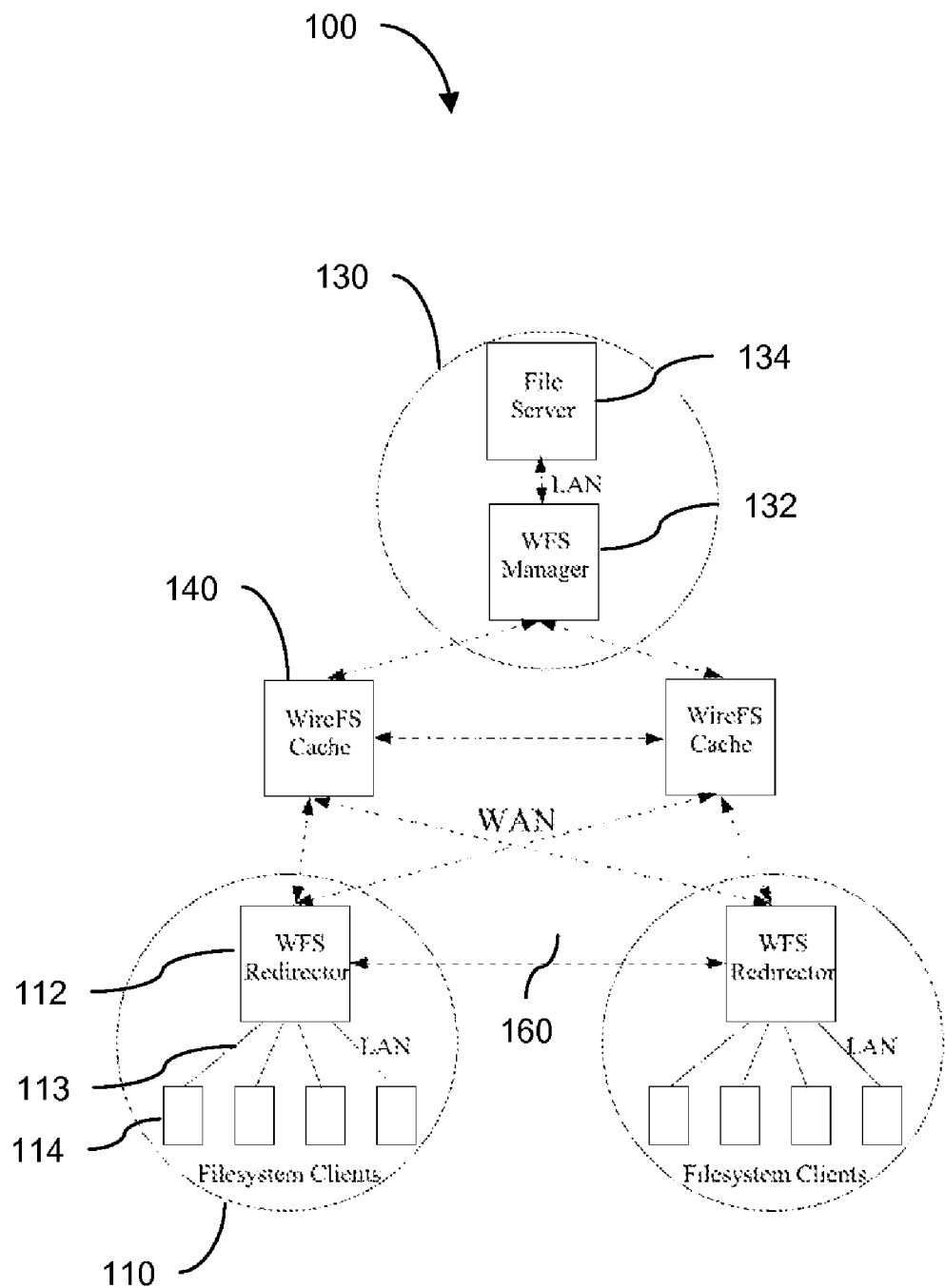
FIG. 1 is a schematic diagram showing a system of the invention.

The distributed file system of the present invention is referred to herein as WireFS. As shown in FIG. 1, the WireFS system 100 targets a distribution of client population (e.g., clients 114) in a number of geographically distributed sites (islands) 110. Each island 110 is composed of a set of clients 114, all accessing a central file server 134 over a wide area network 160. Neither the client side nor the server side in the original file system is modified; instead, cooperative proxies called WireFS redirectors (WFSRs) 112 are interposed in the request path at each client site 110. A redirector 112 is a bridge between the standard file system protocol and the WireFS protocol. It acts as a file server for the clients and communicates with other redirectors over WireFS protocol.

The central file server 134 acts as the final authority on file management in WireFS. The server 134, however, is not involved in all operations. Instead, the metadata of each file (or directory) is assigned a home—either the central server 134 or some WFSR 112 in the system. The home of a file is delegated the responsibility for file management and allows WireFS optimizations in file lookup and transfer. Data synchronization between WFSRs and the central server is through a WireFS Manager 132 (WFSM). Cooperative caching, managed by the redirectors on stateless WireFS caches (WFSCs) 140, enables parallel downloading of data files and alleviates the bottleneck at the central server 134.

A suite of algorithms is provided for performance optimization in metadata and data accesses. The problem of home assignment to redirectors is formulated as an integer programming problem. A dynamic programming algorithm is provided to find the optimal solution in polynomial time, and a faster greedy algorithm. For data management, a distributed randomized algorithm is provided to (approximately) implement a global Least-Recent Used (LRU) queue atop WFSCs. That algorithm incurs little overhead and naturally enables the parallel downloading functionality that is desirable for fast data replication.

The above algorithms make possible a system architecture for an enterprise-wide read-write wide area network file system; a history-based prefetching technique for access latency minimization in metadata operations; a distributed implementation of global LRU cache replacement scheme; and a methodology to evaluate the performance of a wide-area file system using data traces collected from a local area network.

WireFS Architecture

In the following section, the system model and architecture of WireFS are described. FIG. 1 shows the architectural components of WireFS, the system 100 of the invention. The file server 134 is an unmodified NFS or CIFS server which is the final authority on the file contents and presents the only true snapshot of the file system. The file system clients 114 communicate with a WFSR 112 over the Local Area Network 113 using a standard protocol such as NFS or CIFS. The WireFS redirectors 112 cache whole files while only the differences are transmitted for updates. Similar to other networked file systems, WireFS treats directories as regular files with specialized content (list of files). In the following, the term "file" is used to represent both files and directories unless explicitly specified.

The WFSR 132 at the server site 130 has a specialized role in the WireFS protocol. It communicates directly with the server 134 and maintains a global view of the file system namespace. It also records the WireFS specific attributes of files like the home node, ownership information, generation numbers, etc. This WFSR 132 is the home node for all files until that responsibility is specifically delegated to another WFSR. Finally, this WFSR is responsible for the coordinated dissemination of commonly accessed files to multiple WFSRs in the push mode. Due to its specialized role, we call this WFSR the WireFS Manager (WFSM) 132.

The WFS protocol utilizes the additional infrastructure nodes called WFS Caches (WFSCs) 140 to act as storage proxies. Unlike the WFSRs 112, the WFSCs 140 are not bound to any client site and communicate only with WFSRs or other WFSCs. The WFSCs maintain a persistent cache of the data blocks and do not have any knowledge of the file system semantics. That enables them to be stateless and act as helper nodes in the WireFS protocol. WFSCs 140 can be nodes in an overlay network, or can be collocated with the WFSRs. While the caches are not essential for operation of WireFS, they enable migration of commonly used data objects closer to the WFSRs. The functionality of these caches is similar to that of content proxies or disk routers in typical content distribution networks.

The WireFS architecture has two logical components which capture the typical behavior of network file systems: (i) the meta-data layer (MDL) and (ii) the data access layer (DAL). The MDL is composed of a set of WireFS redirectors that serve all meta-data requests including file and directory lookup, creation and deletion of files, and updates to the file or directory metadata (e.g., access time updates). In addition to the traditional file system functionality, the MDL also maintains and communicates the location of the file data blocks in the system. Note that the data can be located in one or more locations including WFSRs 112 and WFSCs 140. The primary goal of MDL is to reduce the latency of the above operations in WireFS.

The DAL enables fast transfer of data across the wide area. The transfer may include original file/directory contents, update logs, and the actual updated data blocks being transferred to the file server. Previous research has demonstrated the benefits of coordinated data transfer across multiple paths in an overlay network. The WireFS DAL takes advantage of such transfers to reduce the bandwidth utilization and multiple round trips over the WAN. Additionally, those transfers populate the WireFS caches, which can then further improve performance for subsequent transfers.

DEFINITIONS

Figure 2:
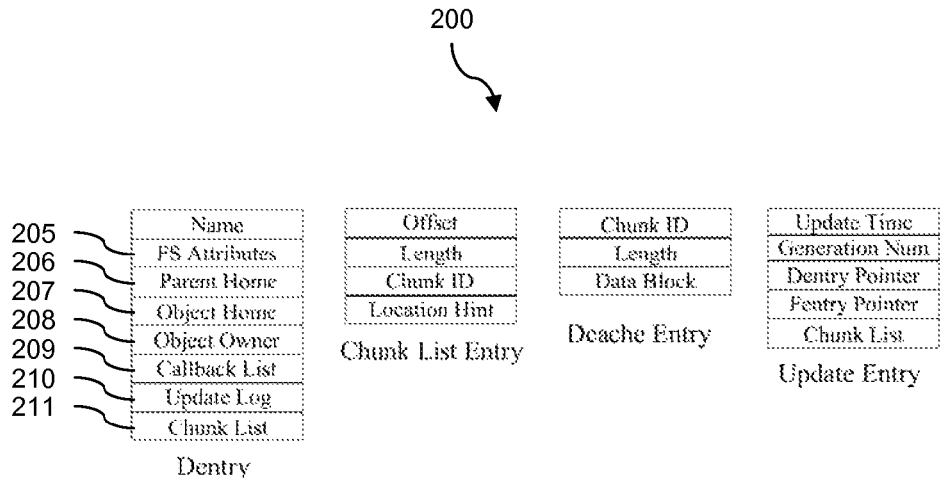
FIG. 2 is a table showing directory and file cache entries in an example system according to one embodiment of the invention.

WireFS associates metadata with each file system object. It is important to note that that information is not visible to either the server or the clients, but is generated and maintained by the WireFS redirectors 112 transparently. The attributes enable WireFS specific optimizations over the wide-area-network. FIG. 2 illustrates directory and file cache entries 200 in WFSR. As shown, for each file, WireFS maintains four additional attributes 205, a chunk list 211, lease or callback list 209, home information for the parent 206 and the file itself 207, and owner information 208. In addition to the extended attributes, update logs 210 are maintained for any updates in queue for the server. Finally, each WFSR maintains a translation table which maps the file handles provided by the server at mount time to the path name of the file on the server.

File Chunks: WireFS partitions each file (or directory) into a list of chunks of data. The chunks are determined by hashing the file content using a collision resistant hash function such as SHA-1, described in U. D. of Commerce/N.I.S.T. FIPS 180-1, *Secure Hash Standard*, U.S. Department of Commerce/N.I.S.T., National Technical Information Service, Springfield, Va., April 1995, which is incorporated by reference herein. The chunk boundaries are determined using the Rabin fingerprinting technique as disclosed in M. O. Rabin, Fingerprinting by Random Polynomials, Technical Report TR-15-81, Center for Research in Computing Technology, Harvard University, 1981, also incorporated by reference herein. To prevent the chunks from being too large, a configurable upper bound on the chunk length is enforced. An SHA-1 hash of each chunk is created and maintained along with the server-provided file handle and the attribute information. The list of those chunks is returned as extended attributes on a lookup request. The list is generated by the WFSM when the first data request is sent to the server and the content is retrieved.

Home: Each file in WireFS is assigned a home node. The home is a WFSR which is delegated the responsibilities to (i) maintain a consistent view of the file; (ii) lazily generate the WireFS attributes on access; and (iii) provide a fixed location for guaranteed access to the files. To maintain a consistent view, the home node is the serialization point for all updates to the file. It arbitrates write access among multiple WFSRs enforcing a single writer, multiple concurrent reader policy. Since all new requests for a file and updates are sent to the home, its copy of the file is the most recent. The home node is also responsible for updating the contents of modified files on the central file server. The home of a file is not static, and is moved to the WFSR accessing the file most frequently. At initialization, the home node for all files is the WFSM. Use of the home node in the WireFS consistency management is described below.

Owner: During WireFS execution, the WFSRs that want to modify the objects request an ownership lease from the home node. That lease gives exclusive update access to the WFSR for its duration, and must be renewed before expiration to ensure updates are applied to the server and thus visible to other clients. Only the owner of the file can modify its contents. By default, the home node of a file is also its owner. The home and owner information are maintained in the WireFS attributes for each file. If a WFSR repeatedly requests ownership of an object (or a set of objects), the home of the object is migrated to the WFSR. That eliminates several redundant round-trips to the home node and improves performance. On moving the home, all existing copies of the file are invalidated and a HOME_UPDATE is sent to the WFSM, which stores that information. On a subsequent lookup, the new location of the home node is determined from the WFSM.

WireFS Objects

Directory Entry (dentry) Cache: The dentry cache is an LRU cache of the recently accessed files. It includes the parent directory information (its home, owner locations), the file name and a list of its locations. A dentry is created lazily when a lookup is performed. Since a lookup descends recursively in the path hierarchy (starting from the root going to the object of interest), each element in the path has a dentry associated with it. In addition to the standard directory information, the WireFS directory includes the information about the parent of the directory, and the location of the WFSR, and the time for which that entry is valid. If no other WFSR has a copy of the file at the time of the lookup, that information is generated at the WFSR. In that case, the object's owner and the home are both assigned to the WFSR initiating the lookup. The WFSM acts as a virtual home of all files not yet delegated. Specifically, it acts as the virtual root of the file system namespace.

Data Cache (dcache): The dcache is a persistent cache of recently accessed data chunks. The first 64 bits of the content hash are used as an index into the cache. Using this index has two benefits: first, it enables sharing common data blocks across files throughout the file system; and second, it allows easy identification of the blocks present in the WFSCs without any associated metadata state. The DAL identifies the data as well as the differences to be transferred between nodes in the system using the dcache.

Update Logs: To prevent several round trips and bursty data transfers over the WAN that significantly reduce performance, WireFS allows a WFSR to apply updates to a file locally. Those updates are not directly sent to the server, but are maintained as persistent time stamped logs at the local WFSR. The logs are forwarded to the home of the file periodically or at the time of a callback. The update logs are discarded once the home node acknowledges the completion of the update of its copy of the file.

Mount Map: WireFS relies on the server system for authentication of clients for mounting the file system. Therefore, the mount request is passed on to the server. The path of the volume at the server system, however, may already be accessed by some other WFSR. To take advantage of cooperative data caching and metadata optimizations for wide area operation, subsequent requests must be redirected within WireFS. Each WFSR maintains a table (Mount Map), which maps the root file handle provided by the server to the path of the mounted volume at the server. The mount map entry also contains the home and owner information of the root directory. Finally, it maintains a link to the parent directory dentry in the local dentry cache.

Example

Figure 3:
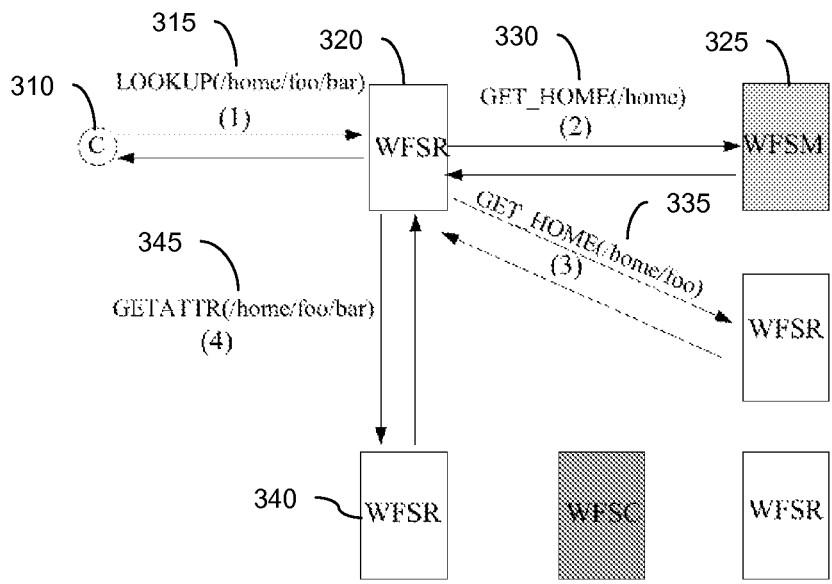
FIG. 3 is a block diagram illustrating a metadata lookup operation according to one embodiment of the invention.

The lookup operation in WireFS is illustrated in FIG. 3. Before issuing any file read or write operation, the client 310 issues a LOOKUP 315. The WFSR 320 looks up the home of the file. Only two levels of indirection are shown in FIG. 3: the WFSR 320 contacts the WFSM 325 and receives (exchange 330) the location of the home of the parent's parent. The WFSR 320 then looks up (exchange 335) the home of the parent. By reading the parent directory contents, the client WFSR 320 identifies the home 340 of the target file and requests (exchange 345) the attributes of the file.

Figure 4:
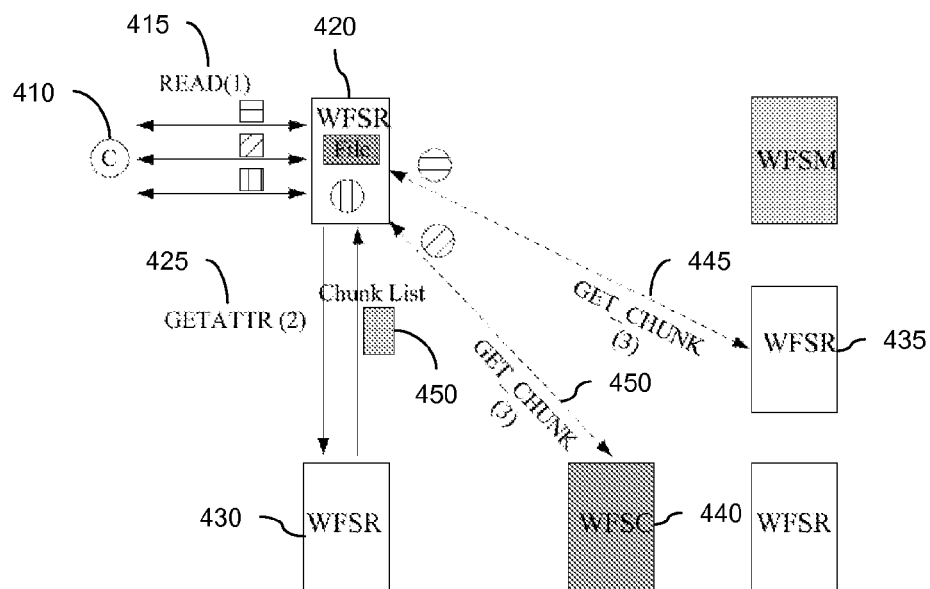
FIG. 4 is a block diagram illustrating a read operation according to one embodiment of the invention.

The operation of a file read is shown in FIG. 4. The client 410 presents the file handle (exchange 415) returned in the lookup. Since the home of the file is known, the WFSR 420 retrieves (exchange 425) the file attributes from the home 430. In WireFS, each file is divided in chunks and a list 450 of these chunks is associated with the file attributes. The file attributes also contain a possible location of each chunk in the WireFS system. The WFSR 420 constructs the whole file locally by gathering data (exchanges 445, 450) associated with each chunk. The data can be located in its local cache, another WFSR 435 or a WFSC 440. The client initiates all data transfers in parallel which reduces the time for the retrieval. While an on-demand transfer is shown, the WFSR 420 can prefetch the file attributes and the file, or the home can push the file contents with the lookup information. As shown in FIG. 4, the current client request 415 and all subsequent read requests are satisfied from the reconstructed file.

Figure 5:
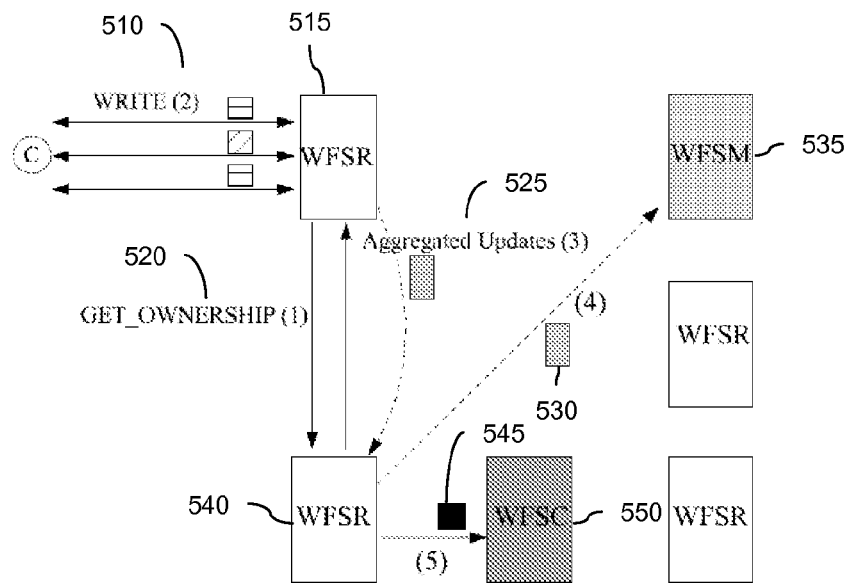
FIG. 5 is a block diagram illustrating a write operation according to one embodiment of the invention.

FIG. 5 shows a write operation according to the invention. Here the client WFSR obtains exclusive access by acquiring ownership of the file (exchange 520). The client write requests are satisfied at the WFSR 515 and update logs are generated (exchange 510). The update logs contain the differences between the original file contents and the updated file. The WFSR then propagates those updates to the home 450 which regenerates the file attribute list and updates the chunk location hints (exchange 525). Finally, the original file is updated (exchange 530) at the WFSM 535 which streams the differences to the server. Steps 525, 530 are performed asynchronously. Updates can be aggregated by the owner 515 and the home 540 before committing them at the file server. Finally, the home WFSR 540 can push (exchange 545) the new chunks of data to WFSCs 550.

WIREFS Meta-Data Layer

The design of traditional network file systems like NFS assumes the clients and the server are connected over a low latency network. That allows each file system operation to perform multiple remote procedure calls (RPCs). While that is acceptable over a LAN, each additional round trip over a wide area network results in reduced performance. For data transfers, the additional latency can be masked by aggressive prefetching and writing back bulk data. However, for typical meta-data operations like file lookup, open, delete, etc., the short RPC messages lead to a significant increase in the response time. Such large overheads subsequently affect the performance observed by the clients as any data transfer is preceded by one or more meta-data operations. For example, before reading a file, the client must perform a recursive directory lookup, followed by authentication and attribute checks. Therefore, for any wide area file system, improving the performance of the meta-data operations is of utmost importance.

Recently proposed wide area file systems rely on a central server for all meta-data operations. For a large client population, such operations contribute towards a heavy load on the server. To reduce the load on the central server, file systems over Distributed Hash Tables (DHTs) have been proposed which do not have a central server, and the participating nodes cooperatively provide its functionality. Unfortunately, in that model, the hierarchical structure of the file system namespace is lost and the cost of lookups of files and directories can be up to O(log(n)) round trips (where n is the number of participating nodes), which is unacceptable over a wide area network.

WireFS MDL takes advantage of the hierarchical path name structure of the file system to: (i) reduce the load on a central server, and (ii) enable efficient lookup of file system objects over a wide area network. The MDL is a logical construct composed of all the WFSRs in the system. When a client connected to a WFSR mounts an exported volume, the WFSR becomes a participant in the MDL. It then caches meta-data information related to the volume and the objects accessed through it.

Figure 6:
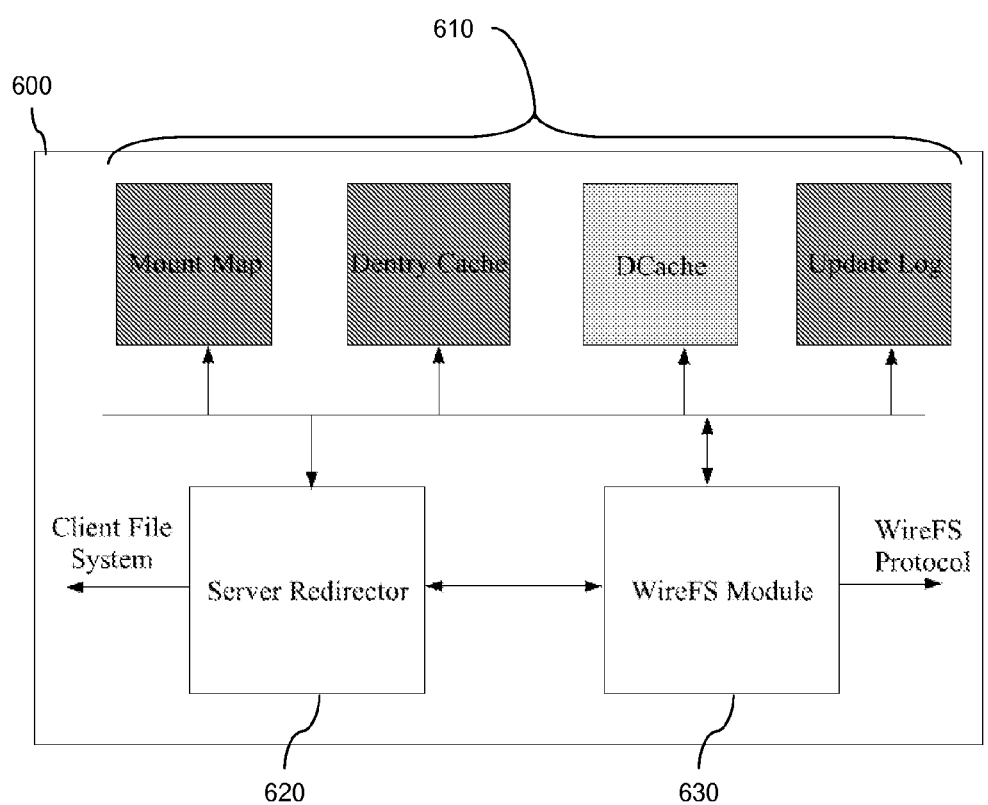
FIG. 6 is a block diagram illustrating a node architecture according to one embodiment of the invention.

FIG. 6 shows the architecture of a WFSR node 600. The shaded boxes 610 show the components involved in the MDL; i.e., the persistent caches stored on the stable storage. The WireFS module 630 communicates with other WFSRs and the WFSM. The server redirector 620 acts as the file server for the clients within the Local Area Network and forwards any requests for WireFS to the WireFS module.

Path Lookup: The clients look up the path of the file (or directory) starting from the root of the mounted file system and descending through the path hierarchy. The client starts the lookup from the first component of the path for which the file handle is invalid. In the worst case, this lookup starts at the root of the mounted volume.

Figure 7:
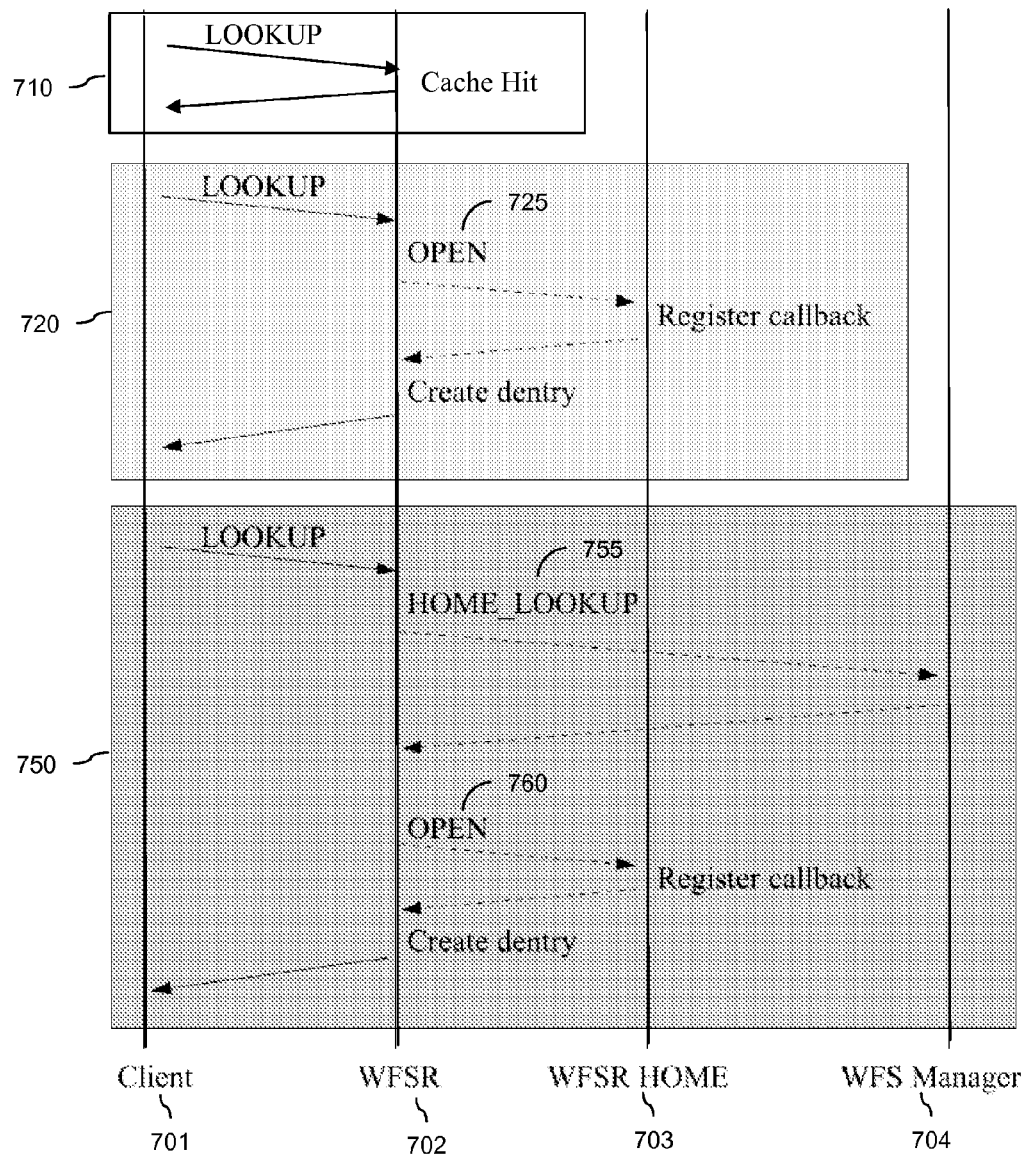
FIG. 7 is a timeline illustrating a lookup operation according to one embodiment of the invention.

The WFSR performs two operations on receiving the lookup request. First, it translates the file handle to the server path name (on which the WireFS lookup hierarchy is constructed). Three cases of the lookup operation are illustrated in the three time lines of FIG. 7. The solid lines of FIG. 7 show local area communication, while the dotted lines show messages transmitted over the wide area.

Case 710 is the case where the file handle is cached at the WFSR 702. If the file handle is cached and is valid (there is no pending callback), the WFSR 702 returns it.

Case 720 illustrates where the home 703 of the file is known. If the cached handle is invalid and the home 703 of the parent directory is known, the cached entry is purged and an OPEN request 725 is forwarded to the home of the parent.

Case 750 shows where the home information is retrieved from the WFSM 704. If the parent's home is unknown, the WFSR sends a HOME_LOOKUP request 755 to the WFSM and sends the OPEN request 760 to the returned home node. The parent is guaranteed to have either the file handle information or the location of the delegated node that has the file handle information.

The OPEN request registers a callback with the home node to invalidate the WFSR cache on an update. It also retrieves the attributes of all children of the lookup target. Note that by using an invalidation based scheme over the WAN, the number of round-trips is significantly reduced, and consistency of the file across the wide area network is guaranteed. Moreover, since the number of WFSRs is limited (100s), the state maintenance overhead at the home node is not very high. At the same time, characteristics of the file system over the LAN are preserved without modifying the existing implementation of the protocol.

Attribute and Directory Content Retrieval: The client uses the GETATTR RPC to (i) identify the attributes of a file (after looking up its parent directory), and (ii) validate its cache contents. The arguments to GETATTR include the file handle of the file. As described above, the WFSR retrieves the attribute information of all children of the lookup target along with the OPEN call. If the GETATTR is performed close to the LOOKUP, most likely the attribute information would be cached. The client is returned this cached information if there is no outstanding callback. Similarly, READDIR and READDIRPLUS can be satisfied from the cache. If the attributes are not cached or the cache is invalidated, however, the request is sent to the home node of the file which must return the correct attributes and/or contents. Since GETATTR is usually followed by a read/write access, WireFS can initiate a read-ahead of the target file and can satisfy the read requests without waiting for the data in the critical path. The read and write operations are detailed in the next section.

Access Latency Reduction in Meta Data Layer

Figure 8:
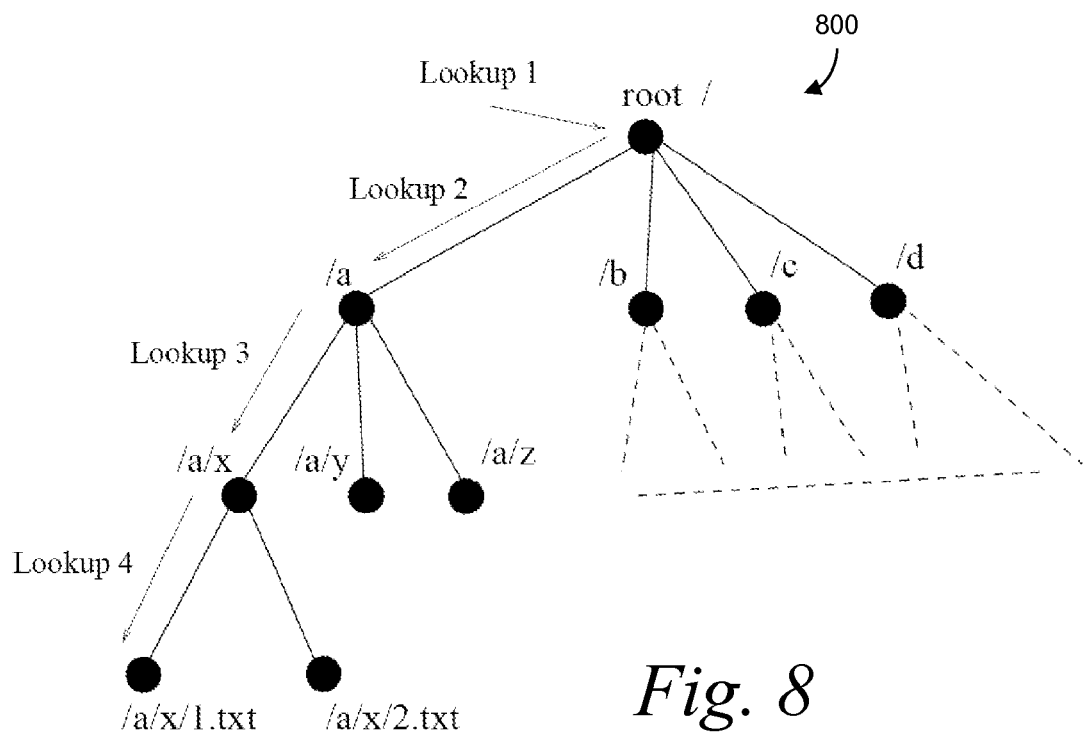
FIG. 8 is a directory tree illustrating a lookup according to one embodiment of the invention.

1) Problem Definition: A virtual namespace tree rooted at the directory "/" is used to model the file organization in NFS. A NFS file lookup comprises a series of sub-lookups that traverse the directory path from the root node to the file node on the directory tree. For example, in the directory tree 800 shown in FIG. 8, to look up the directory entry for the file "/a/x/1.txt", the lookups for "/", "/a", "/a/x", and "/a/x/1.txt" are executed in order.

Figure 9:
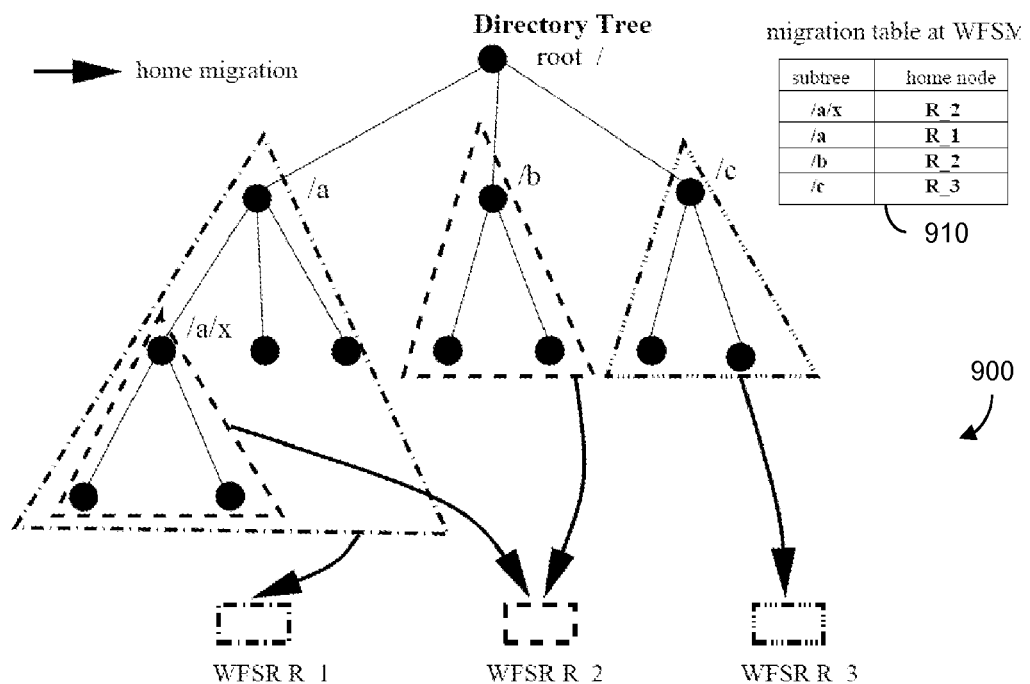
FIG. 9 is a directory tree illustrating a home migration according to one embodiment of the invention.

In a LAN setting the multiple lookup round-trips are invisible to end-users due to fast local transmission speed. The network latency in a WAN, however, is large enough that a file lookup can take up to seconds to finish. That makes the response time intolerable during normal file operations. To alleviate that performance problem, the solution of the present invention is based on the following observation: if most of the accesses into a subtree in the directory tree come from one site (through a WFSR), the administration privilege of that subtree is assigned onto that site (WFSR). That task delegation is called a home migration, and that WFSR is called the home node of that subtree. Note that home migrations can occur recursively, in that a subtree migrated to one WFSR may have its own subtree migrated to another WFSR node. Therefore, the directory tree is decomposed into multiple sub-trees based on access statistics. The assignment scheme is designed for home migrations so that the total access latency is minimized. In addition, to allow fast (one-hop) resolution of home nodes, a migration table is maintained at WFSM, the central server side, which keeps one pointer (the address of the home node) for each distinct migrated sub-tree. FIG. 9 shows one example for home migration, including a directory tree 900 and a migration table 910.

Formally, the WFSM is labeled as $R_0$, the n WFSRs as $R_1$, $R_2$, ... $R_n$, and the network latency (RTT) between $R_i$ and $R_j$ as $L_{R_iR_j}$. When a file lookup from $R_i$ traverses a directory node $D_x$ ($1 \leq x \leq m$, where m is the number of directory nodes), it is called one access of $R_i$ on $D_x$. For each node $D_x$ in the directory tree, a stack of n registers $\{C_{D_xR_i}, i \in [0,n]\}$ record the expected access times of each WFSR on $D_x$ during the next time period T. In the experiments, the inventors used an exponential weighted moving average (EWMA) counter to approximate the access register based on past historical information.

Access latency optimization is now formulated as an integer programming problem:

$$\min \sum_{x=1}^{m} \sum_{i=0}^{n} I_{D_xR_i} \left( \sum_{j=0}^{n} C_{D_xR_j} L_{R_jR_i} + M_{D_xR_i} \right)$$

subject to $I_{D_xR_i} \in 0,1$, and $$\sum_{i=1}^{n} I_{D_xR_i} = 1$$

where $I_{D_xR_i}=1$ if the subtree rooted at $D_x$ will be migrated to $R_i$, 0 otherwise. $I_{D_xR_i}(\Sigma_{j=1}^{n} C_{D_xR_j} L_{R_jR_i})$ is the total access cost to the directory node $R_i$ if the subtree rooted at it is migrated to the home node $R_i$. $M_{D_xR_i}$ is the transfer cost of migrating $D_x$ from its current home node to $R_i$.

When there is no migration table size constraint, the optimal solution can be found by deciding the best home node for each directory node individually. Next is presented the algorithm to compute the optimal solution of the optimization problem when there is a migration table size constraint.

2) Optimal Solution under Constrained Migration Table: Let $P_{max}$ (<the directory size) be the maximum number of pointers that the migration table can contain. Deciding the $P_{max}$ distinct subtrees is similar to many cache or filter placement problems in the literature. To find the optimal solution in a bounded-degree directory tree, the following problem can be solved using dynamic programming.

(i) Let access $(D_x, k, H_p(D_x))$ be the optimal access cost for the directory (sub)tree rooted at $D_x$ given that there are k pointers left for this subtree and the home node for the parent node of $D_x$ is $H_p(D_x)$. Starting with access ("\", $P_{max}$, $R_0$) on the root node, the rest of the nodes are enumerated following breadth first search.

(ii) At each directory node $D_x$, the optimal assignment is decided as:

- If k = 0, all nodes in the subtree will be assigned to $H_p(D_x)$ and access($D_x$, k, $H_p(D_x)$) =

$$\sum_{z: nodes\ in\ the\ subtree} \sum_{j=0}^{n} \left( C_{D_xR_j} L_{R_jR_{H_p(D_x)}} + W_{D_xR_{H_p(D_x)}} \right).$$

- Otherwise, access($D_x$, k, $H_p(D_x)$) =
min {
min [ for all possible allocation schemes (z, $A_z$) of k − 1 pointers on the children of $D_x$ $$\sum_{j=0}^{n} \left( C_{D_xR_j} L_{R_jR_y} + W_{D_xR_y} \right) +$$

$$\sum_{z: child\ of\ D_x} access(z, A_z, y)\ \text{for every}\ y \neq H_p(D_x)$$

]
min [ for all possible allocation schemes (z, $A_z$) of k pointers on the children of $D_x$ -continued $$\sum_{j=0}^{n} \left( C_{D_x R_j} L_{R_j} R_{H_p(D_x)} + W_{D_x} R_{H_p(D_x)} \right) + \sum_{z:\text{child of } x} \text{access}(z, A_z, H_p(D_x)) \right]$$

The dynamic programming algorithm finds the optimal solution in $O(P_{max}^D m^2 n)$ time, where D is the maximal degree in the directory tree. That can be proven in an analysis similar to the one for the k-median problems on trees set forth in A. Tamir, An $o(pn^2)$ Algorithm for the p-Median and Related Problems on Tree Graphs, Operations Research Letters, 19:59-64, 1996, which is incorporated by reference herein.

3) A greedy algorithm under Constrained Migration Table: While it is possible to find the optimal solution in polynomial time, the (likely) enormous directory tree size m and large degree bound D make it desirable to find a "good enough" solution as quickly as possible. Toward that goal, the following algorithm is proposed:

(i) Initially, for each directory node $D_x$ the home node which minimizes the total access cost on Dx is labeled as $H(D_x)$, and assign $D_x$ the weight $W(D_x)$ as $$\left( \sum_{j=0}^{n} C_{D_x R_j} L_{R_j H(D_x)} + M_{D_x H(D_x)} \right).$$

(ii) The migration table is initialized with one entry which records the home node for the root directory is WFSM ($R_0$).

(iii) All nodes are put into an ordered linked list where the descending order is based on the weight $W(D_x)$. For two nodes with the same weight, the tie is broken by giving the node with the smaller summation of all register values a higher position.

(iv) The following operation is repeated until either all k migration table entries are filled up or the ordered list is empty:

Remove the head node in the ordered list, put it into the migration table and assign it to $H(D_x)$ if its closest parent node in the migration table is not assigned to the same node as $H(D_x)$. Otherwise it is not put into the migration table.

When a new node $D_x$ is put into the migration table, an immediate successor node of $D_x$ in the migration table is removed if its assigned home node is the same as $H(D_x)$.

(v) For any node $D_x$ not in the migration table, its assigned home node assigned ($D_x$) is equal to the home node assigned to the closest parent node on the directory tree.

The greedy algorithm finds an assignment scheme in $O(m \log(m) + P_{max} m)$ time. Proof Sorting the list takes $m \log(m)$ time. For each new node to be put in the migration table, checking its parent or child nodes takes $O(P_{max})$ time and at most m nodes will be tried as a new node for the migration table. As will be demonstrated below, the above-described greedy algorithm works well in practice.

WireFS Data Access Layer

The data access layer of a wide area file system must have two main characteristics. First, it must enable efficient access to large read mostly data objects such as software packages. Such data objects are shared by almost all users of the file system. It must also support efficient dissemination of updates to multiple client sites where the modified object is being accessed. Second, it must improve the access and update performance of mostly private data, typical to the desktop/workstation usage of an end users' home directory. That data is typically not shared outside the local area. There are, however, frequent updates to files and directories in such access which must be propagated to the file server.

To accomplish the above, the data access layer in WireFS uses a hybrid push-pull mode of data access. The home node or the WFSM can aggressively push the most commonly used files and directories to multiple WFSRs. The WFSRs can also initiate such transfers in a pull mode for prefetching. Finally, both push and pull can be used for on-demand transfers. In the following, the read and write operations in WireFS are first summarized, the push and pull mechanisms are described, and finally the tradeoffs in the data access layer design are discussed.

Read: When a file is looked up in WireFS, a list of file chunks and hints of their locations are returned. Note that the file chunks are created at the home of the file. If there is no existing copy of the chunk in the system, the hint is simply NUL and the data is retrieved from the server. Otherwise, the home maintains a list of possible locations of the chunk (WFSR or WFSC) and returns it as hints.

The WFSR requesting the read proceeds in three stages. First, it checks its cache for the chunks and satisfies the requests corresponding to those that are found locally. Second, if the chunks are not cached locally, the WFSR requests the chunk from one or more data stores provided in the location hints. Finally, if the data is not found, a transfer is initiated from the home node. The home node retrieves the data from the server and may optimistically store the new chunk data in one or more WFSCs. The chunk list and thus the dentry modification is piggybacked on the data transfer.

Since most files are read sequentially, the WFSR tries to retrieve the whole file on a read access on any chunk in the file. For large file transfers, the WFSR can request different chunks from multiple locations. Such parallel data transfer improves the path diversity and therefore the speed of the overall file transfer.

Write: The WireFS consistency mechanism ensures that exactly one WFSR can have write access to a file at any time. Multiple clients, however, can update the file within the local area. The WFSR tries to minimize the number of round trips across the WAN and therefore does not forward all write updates to the home. Instead, it waits for a callback from the home node to push any partial updates to it. If no callback is received, the WFSR waits for the file to be quiescent; i.e., no updates are received for the file for a configurable time period. For network file systems supporting leases (e.g., NFSv3), that duration can be twice the lease duration with a write slack for any delayed updates.

Only the differences between the old and the new files are propagated to the home node. To prevent redundant and bursty transmissions, the local WireFS redirector logs all updates in a persistent log, which is cleaned periodically to eliminate redundant updates. The updates are streamed to the home node, which applies the differences, reconstructs the chunk list and pushes out the new dentry and the differences to all the WFSRs that have registered a callback for the file. That update can also seamlessly include one or more WFSCs and thus populate the caches with the fresh chunks. It is important to note that only an insertion of the new chunks is performed in the dcache. The original chunks are kept around to take advantage of any commonalities in the files.

Cooperative Caching in Data Access Layer

1) Three-Layer Data Access Hierarchy: In NFS a client maintains a local cache for fast retrieval of the files accessed in the near past. While local clients may not have enough disk budget to support a high hit ratio, the intermediate cache system can be utilized to provide a global Least Recently Used (LRU) queue for the file system. The cache system can work as a unified disk for all WFSRs to manage the data files that are being accessed by clients and whose administration privileges have been migrated to the WFSRs. That will alleviate the bottleneck on the central server side in data transferring and file updating. Besides, by partitioning a file into multiple blocks and putting the blocks in multiple cache nodes, parallel downloading is enabled for fast data replication.

Figure 10:
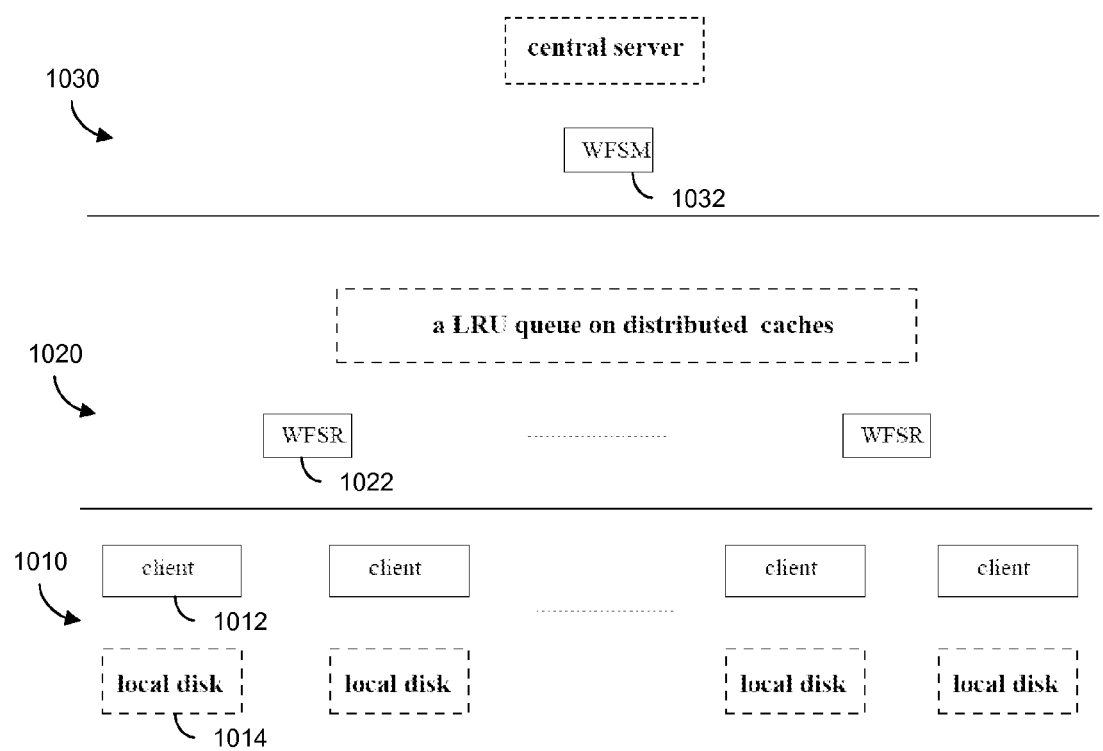
FIG. 10 is a block diagram showing a three-layer hierarchy of data file access according to one embodiment of the invention.

As shown in FIG. 10, there are three data layers in the WireFS file system of the invention: a local disk layer 1010 storing temporarily cached files, distributed caches 1020 (WFSCs) keeping WFSRs' copy of the files which are being interested by clients and up-to-date, and the central server layer 1030 having the copies of all files which will be periodically synchronized with the version at the WFSRs. When a client 1012 requests a data file that has no valid copy at the local disk 1014, the WFSR 1022 coordinates the file fetch from either the cache system 1020 or the central server 1032. While maintaining a global LRU queue can be achieved by allocating a node (e.g., the WFSM) for centralized administration or running the top-K oldest file service, it may incur either single point of failure or excessive query overhead. The goal of the present invention in data file management is an efficient algorithm that implements a global LRU on the WFSR caches (WFSCs) in a distributed fashion;
    enables parallel downloading; and
    achieves load balance among the caches.

2) A Distributed LRU Algorithm: A simple distributed randomized algorithm is proposed that works as follows. When a client has a file to move from its local disk into the cache system (either due to the new version update or local file eviction):

(a) The client forwards the complete file to its local WFSR, which decomposes the file into m chunks based on the WireFS chunking method, and then evenly divides them into K chunk sets (hereinafter called "bins"). Note that m is a variable dependent on the file size while K is a constant. A small chunk size may be chosen so that m is close to K only for small files.

(b) The WFSR chooses one hosting WFSC for each bin using a consistent hashing technique such as that described by D. Karger, E. Lehman, T. Leighton, M. Levine, D. Lewin, and R. Panigrahy, Consistent Hashing and Random Trees: Distributed Caching Protocols for Relieving Hot Spots on the World Wide Web, in ACM Symposium on Theory of Computing, pages 654-663, May 1997, which is incorporated by reference herein. The bins are inserted into those WFSCs along with the latest access time stamp of that file.

(c) Each hosting cache server receiving its bin will update its local queue with the LRU (Least Recently Used) scheme. The update unit is in bins.

(d) If a file has some bin evicted during the process, all other bins of the file will also be evicted from the system. That is for file atomicity maintenance.

Next, the behavior similarity is shown between the distributed caches (hereinafter called distributed LRU queue) and an explicitly maintained global LRU queue (hereinafter called global LRU queue).

Assume that all files will have K bins after the partition. Then,

When $K=\theta\sqrt{N}$, the globally oldest file in the distributed LRU queue will not be older than that in the global LRU queue with high probability, where N is the network size of the cache system. Proof: Assume the oldest file of the global LRU queue is still in the cache system, then a new file insertion will result in a collision of one new file block and one oldest file block with a probability $$1 - \left(1 - \frac{K}{N}\right)^K \geq 1 - \frac{1}{e^{\frac{K^2}{n}}}.$$

That probability is close to 1 when $K=\theta\sqrt{N}$.

Assume that all files can be chunked into K equal-sized bins, and all cache disks have the same size and can accommodate $\Omega(\log N)$ bins, where N is the network size of the cache system. Then, When $K=\theta\sqrt{N}$, the files in the distributed LRU queue will be the same as the files in the global LRU queue except the oldest $O(\sqrt{N} \log N)$ files in the queues with high probability. The proof is based on the results of the classic occupancy problems described by R. Motwani and P. Raghavan, In Randomized Algorithms, Cambridge University Press, 1995, which is incorporated by reference herein.

Figure 11:
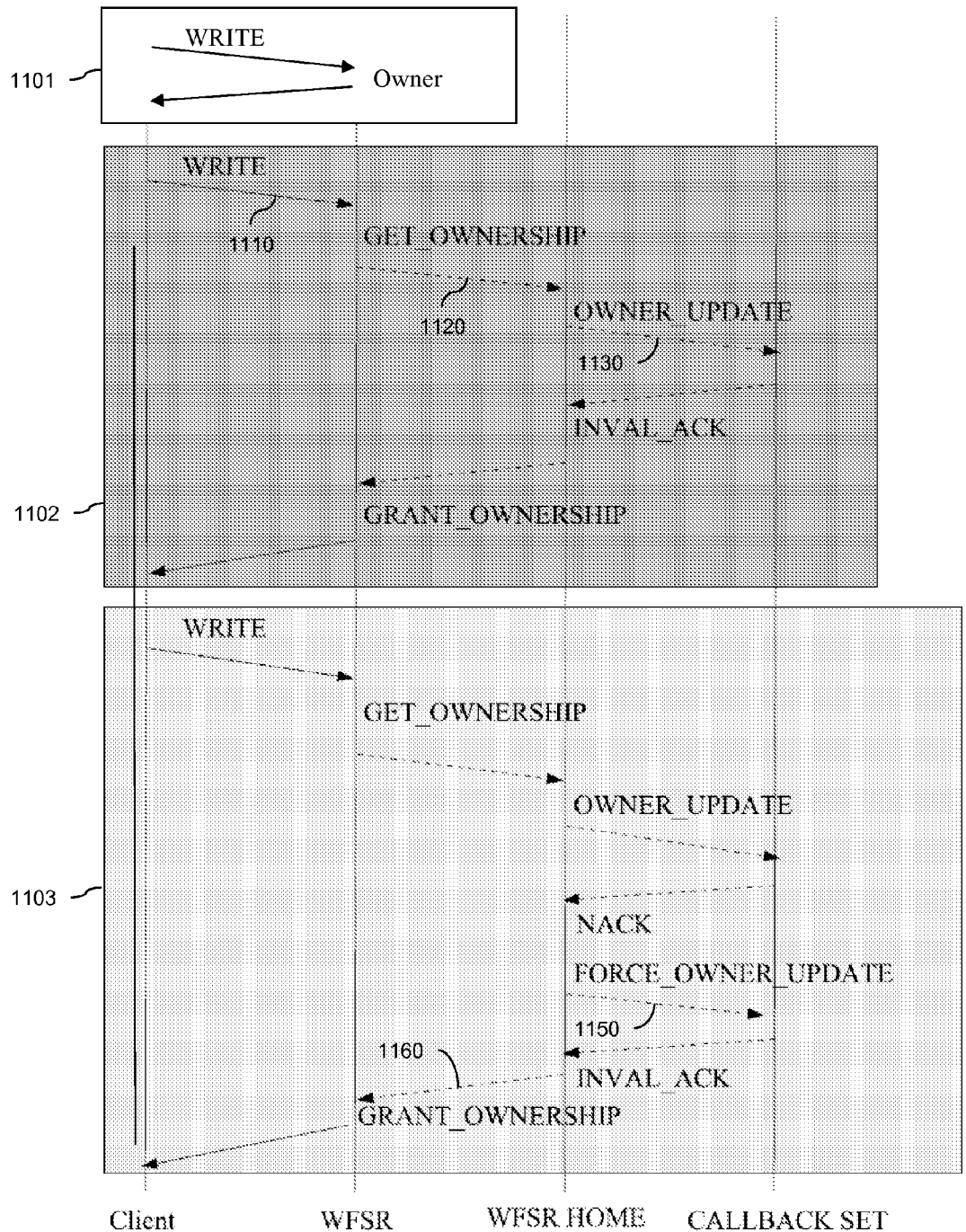
FIG. 11 is a timeline illustrating ownership assignment according to one embodiment of the invention.

FIG. 11 shows a time line for getting the ownership of a file for the write operation. There are three cases. In case 1101, the file handle is owned by the WFSR. In case 1102, the home gets the ownership update acknowledgement from all WFSRs in the callback list. In case 1103, a WFSR is forced to relinquish ownership. The solid lines show local area communication while the dotted lines show the messages over the wide area.

FIG. 11 illustrates a mechanism of acquiring ownership of the file and performing updates in WireFS. When a client inserts a file in its cache, it notifies the home using an OPEN RPC. That can be performed at first access, or optimistically along with the data request. The home node records all WFSRs that intend to cache the file in the dentry callback list.

If a client requests a write 1110, the WFSR must acquire the ownership of the file/directory being updated. Since NFSv3 does not have an explicit open, it must be approximated by starting the GET_OWNERSHIP 1120 on receiving the first write request from the client. The write request is delayed until the ownership is received. For the client, it is no different than a delay at the server. On receiving the ownership, the updates are logged to the stable storage and are pushed to the home node later. That write behind enables aggregation as well as difference elimination in the update stream. While the presently described scheme cannot prevent conflicting concurrent updates, the situation is no worse than in the standard NFS. In NFS over a LAN, the updates can still be lost for a short (typically 30s) window which is used for aggregating updates.

On receiving an ownership request for a file, the home sends an OWNER_UPDATE 1130 to all the WFSRs in the callback list of the file including itself. If there are no writes pending, the WFSRs invalidate their caches and return immediately. The client must repeatedly contact the WFSR for files that are open and being actively updated. Files that have not seen an update in more than twice the maximum delay period (typically 60s) are considered quiescent. The WFSR must return pending updates and invalidate its cached copy for quiescent files as well. However, if the file is actively being updated, the WFSR can respond with a failure similar to "try again later." The home can force the WFSR to yield the ownership (action 1150) if the GET_OWNERSHIP call is retried a configurable number of times or after a long delay. On receiving a successful response from all WFSRs caching the file, the home grants the ownership 1160 to the requesting WFSR.

During the update, all requests for the file go to the owner, who must respond to the read requests. Note that the owner cannot receive a GET_OWNERSHIP request. Finally, the home node can propagate updates to the file server. To reduce the size of the messages, the home sends the WFSM the updated file chunk list. The chunks not found at the WFSM are then requested from the home node. Once the file can be reconstructed at the WFSM, it is updated at the file server.

Evaluation

Experiment Setup

Figure 14:
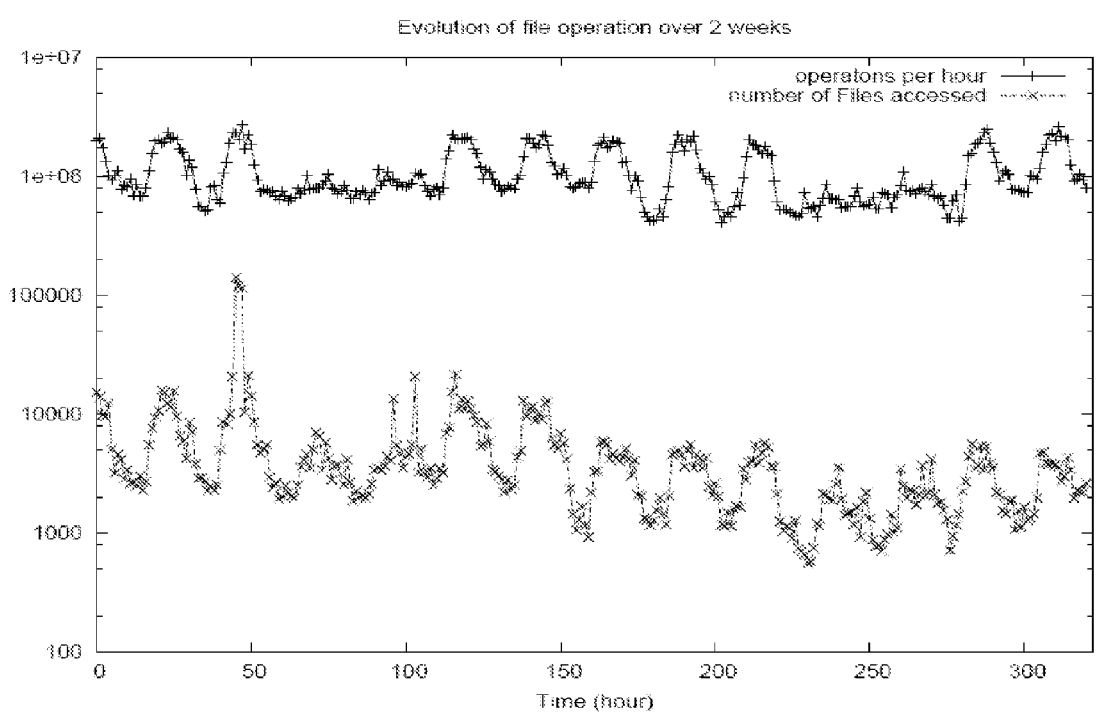
FIG. 14 is a graph showing file operations over two weeks on a system used in evaluating the present invention.

To evaluate performance of the present invention, the publicly available NFSv3 trace from Harvard SOS project was used. The Harvard trace includes up to three months of real campus NFSv3 traffic in different deployments. The most diverse workload, including a mix of research, email and web workload, was chosen. In the simulation, data from the first two weeks is extracted to evaluate WFS performance with different configurations. The trace features have workload and operation diversity where 993 k distinct files with 64 k directory files are monitored. In terms of file operations, 384 million NFS RPC call/response pairs are recorded over the consecutive 14 days. The RPC call breakdown is presented in the table 1200 of FIG. 12. From the table 1200, it can be observed that 32% of those operations are composed of 'lookup', 'getattr', 'setattr' and other metadata operations. The evolution of those access patterns with time is indicated in the plot of FIG. 14. It is observed that there are approximately one million file operations per hour along with the number of distinct accessed files varying between 1 k and 100 k. 75 distinct hosts IP addresses are identified from the trace, which are used for creating user groups.

To emulate the enterprise environment with branch offices, the total 75 hosts are partitioned into 10 groups/sites with the access pattern following uniform and Zipf distribution. The sites' localization is emulated from the Ping project trace (pdos.csail.mit.edu/strib/p1 app/), from which the round trip time (rtt) information can be randomly extracted between any two measured nodes in Planetlab, a global distributed research platform. The table of FIG. 13 presents the sites location configuration with domain and time zone. Three sites are located on the eastern coast, two on the western coast of the United States, two in Europe, one in South American and one in Asia. A stand-alone file central server is set in the middle of North America.

Figure 15:
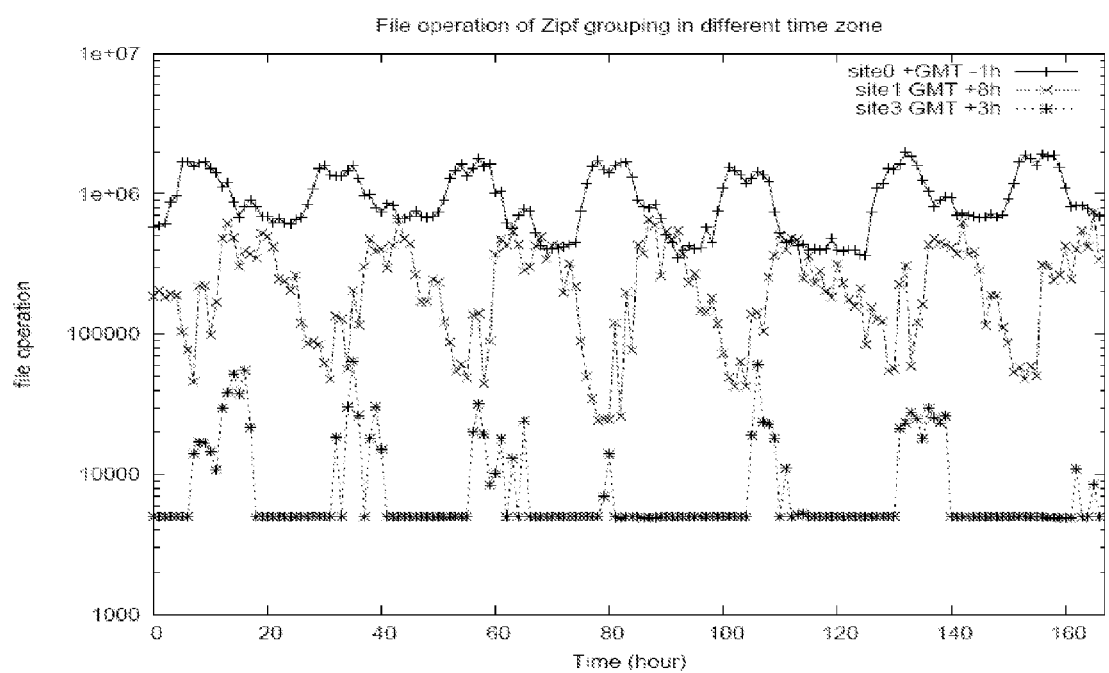
FIG. 15 is a graph showing the operation over time of three sites using Zipf grouping in a system used in evaluating the present invention.
Figure 16:
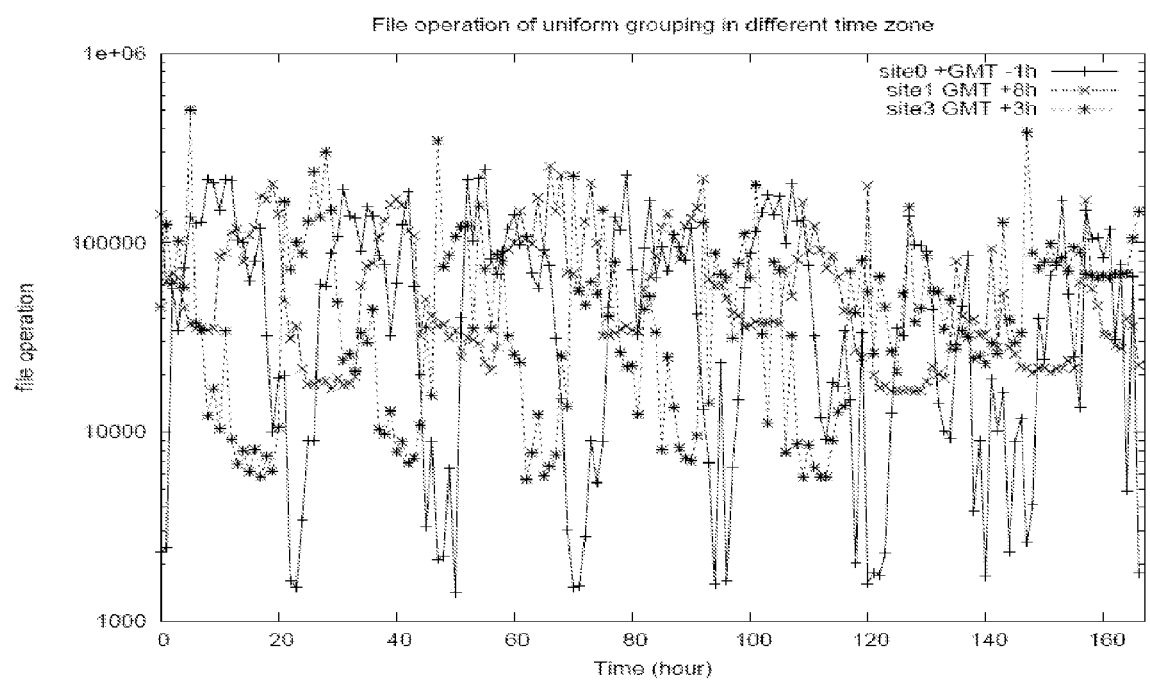
FIG. 16 is a graph showing the operation over time of three sites using uniform grouping in a system used in evaluating the present invention.

The rtt latency varies from 2.4 ms to 358 ms with an average value of 157 ms between two sites. The time zone for each site is also considered by adding a time offset to each sites file operation trace file. The evolution of the file operations with time after grouping is shown for three sites for Zipf distribution in the plot of FIG. 15 and for uniform distribution in the plot of FIG. 16.

Meta-Data Management

Figure 17:
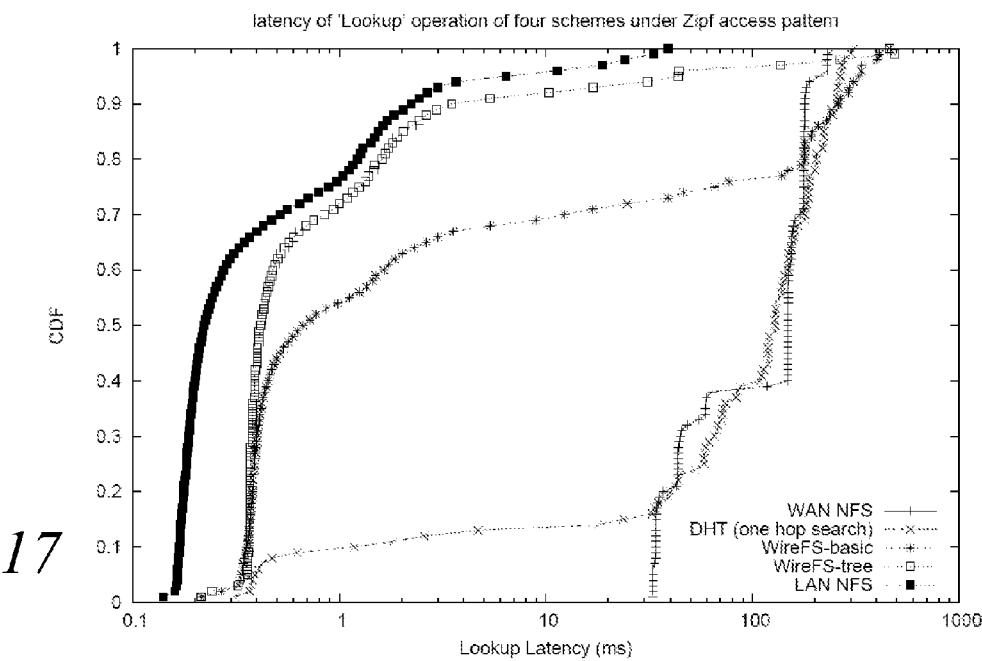
FIG. 17 is a graph showing the CDF of lookup latency for different approaches under Zipf distribution for a system used in evaluating the present invention.
Figure 18:
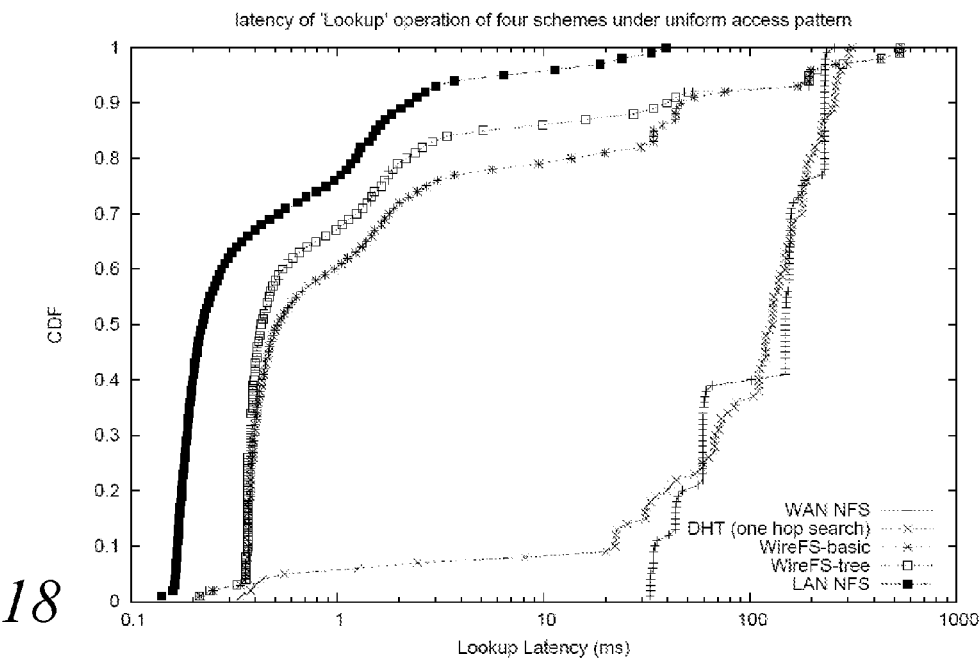
FIG. 18 is a graph showing the CDF of lookup latency for different approaches under uniform distribution for a system used in evaluating the present invention.

Four WAN file system schemes are examined to compare the performance of metadata operation: the plot of FIG. 17 shows the CDF of lookup latency for different approaches under a Zipf distribution, and the plot of FIG. 18 shows the CDF of lookup latency for different approaches under a uniform distribution.

The first of the four examined file systems is the wide area deployment of the NFSv3 system (WAN-NFS). All client groups simply access the files from the remote central NFS server via NFS RPC procedures. The second file system utilizes the DHT based cache schemes (like the SHARK, supra) that uniformly distribute the file object to all the participating sites. One hop search for the file is assumed for remote file objects access. The third system (WireFS-basic) is the basic WireFS scheme of the invention, where home assignment is done for individual files based on access time statistics. The fourth scheme (WireFS-tree) is the WireFS system of the invention with home assignment for a given file is based on the dynamic programming algorithm described above. The raw trace of NFS in local network area (NFS-LAN) latency is also included as the benchmark of all these schemes.

WireFS outperforms the other three schemes in both the Zipf and uniform distributions. 85%-92% of the lookups in WireFS-tree require less than 10 ms compared with 65%-75% for WireFS-basic and less than 15% of DHT schemes. 96+% of the lookups in WireFS-tree have performance comparable to NFS-LAN. Only 2% of WireFS schemes' operations under-perform other schemes due to the worst case scenario resulting in a two hop search.

Figure 21:
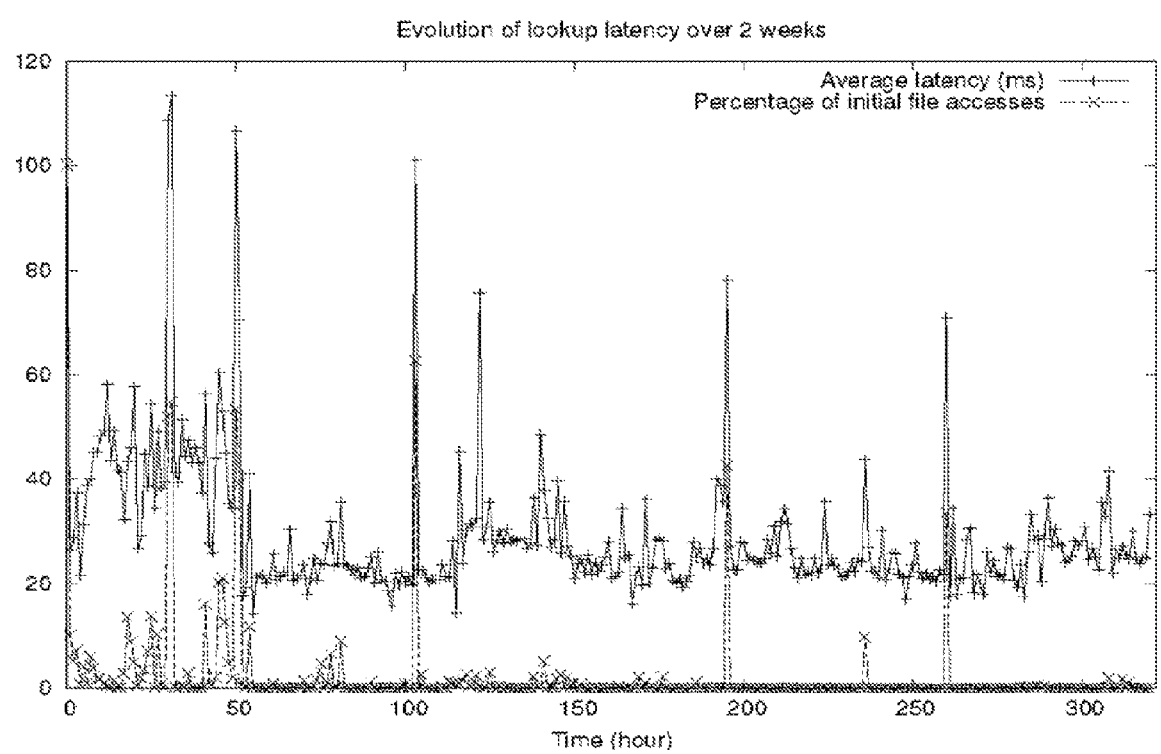
FIG. 21 is a graph showing latency evolution in a system used in evaluating the present invention.

The plot of FIG. 21 presents the evolution of average lookup latency per hour over a 2-week time period. The first-time file access ratio per hour from remote sites is also plotted there. The latency spike is consistent with the spike with the first time remote file access ratio for same time period. That consistency explains the burst remote file access contributes to the latency increment. The succeeding decrease after each latency spike also implies the home assignment reduces the remote access ratio dramatically. Over the first 50 hours, most of the files are first-time explored by remote sites which make the latency oscillate intensively. After that, the latency is pretty stable till another first time remote access ratio spike changes the pattern.

Figure 22:
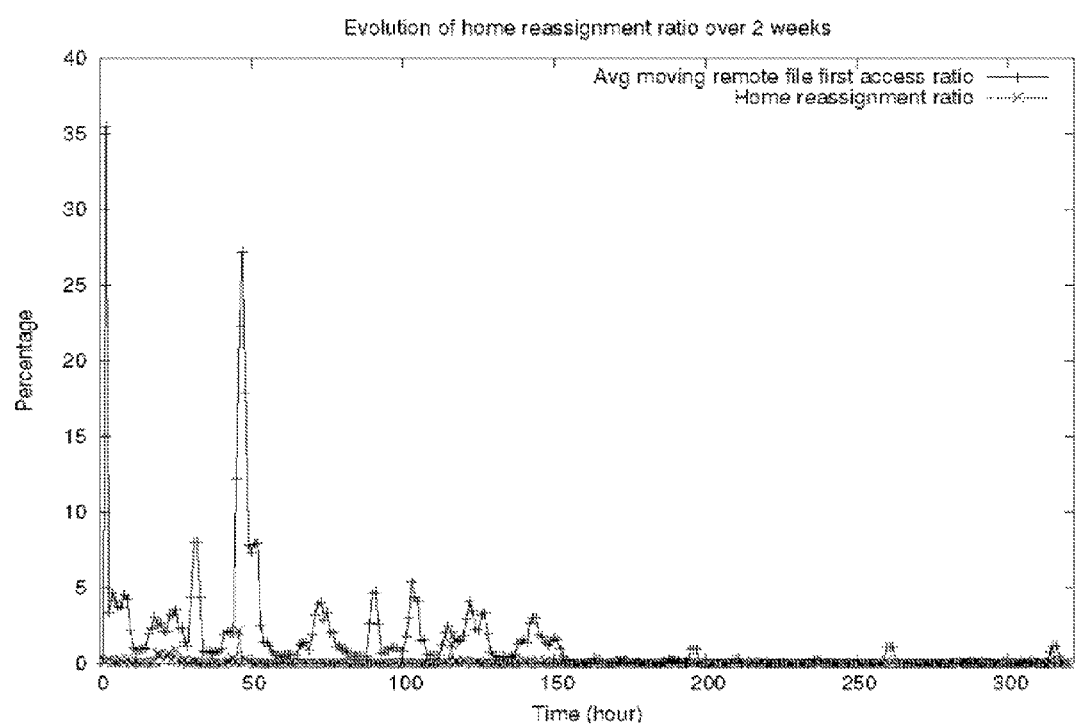
FIG. 22 is a graph showing home reassignment in a system used in evaluating the present invention.

The plot shown in FIG. 22 presents the home reassignment when homed files are subject to access pattern changes under the WFS-tree system. The maximum 2.5% migration ratio and less then 1% home migration after 50 hours demonstrates that the tree hierarchy based home assignment is very good. Moving average (3 runs) remote first access frequency is also plotted there to explain the cause of migration.

Figure 19:
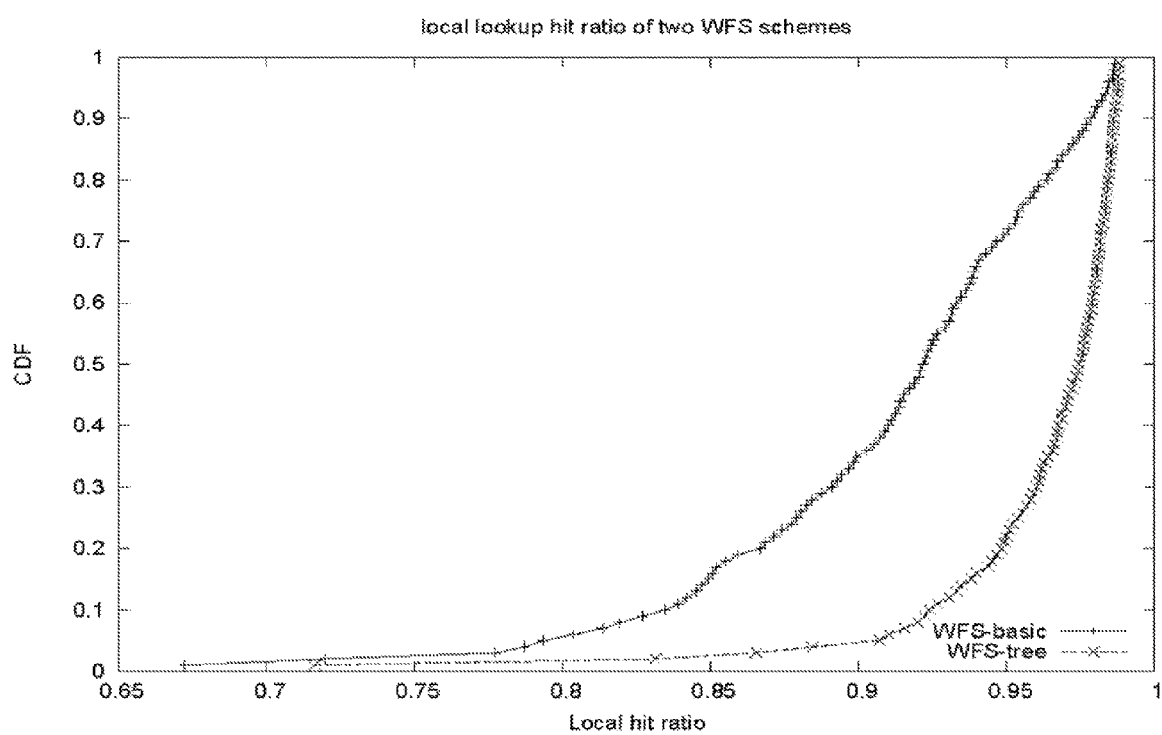
FIG. 19 is a graph showing the CDF of local hit ratio for two WireFS schemes used in evaluating the system of the present invention.
Figure 20:
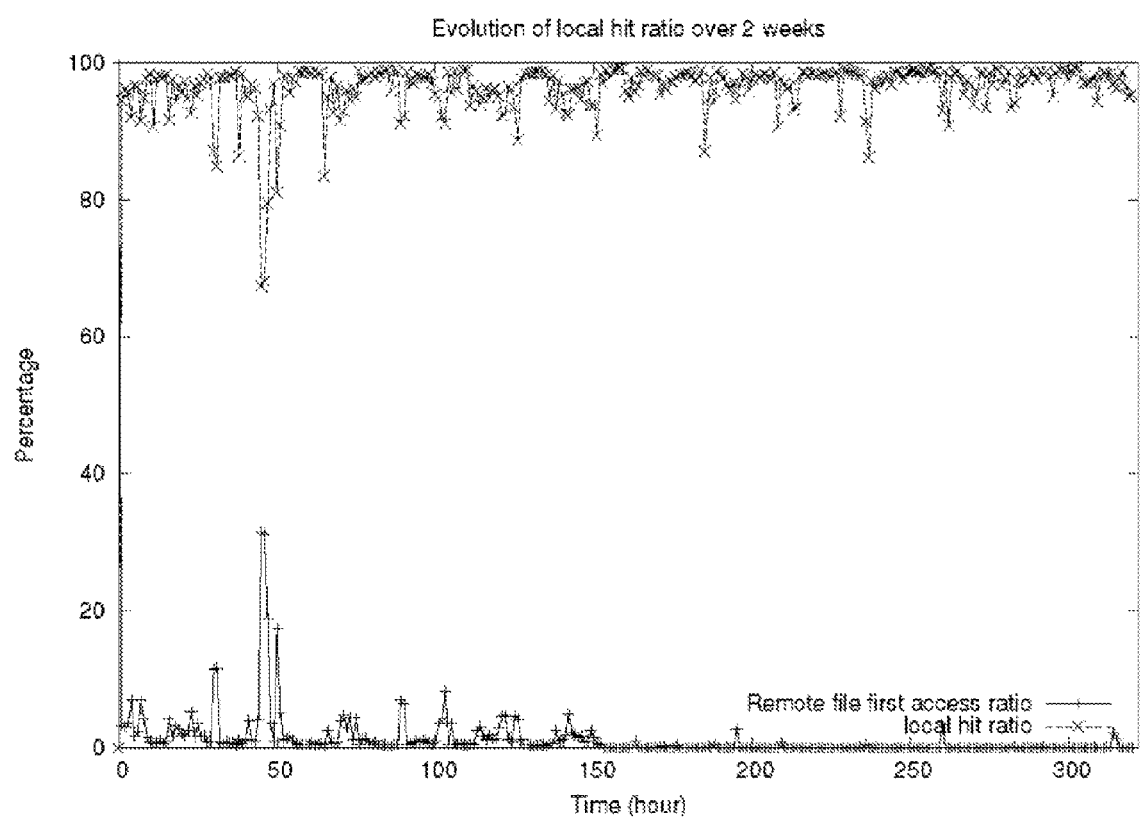
FIG. 20 is a graph showing the local hit ratio of a system used in evaluating the present invention.

In the plot shown in FIG. 19, the performance of WFS-tree and WFS-basic schemes are compared. The WFS-tree outperforms the WFS-basic system with a smooth hit ratio over 95%, while the WFS-basic experiences hit ratio oscillation due over the experiment with average value less 90%. The plot of FIG. 20 shows that the local hit ratio of WFS-tree averages 96%. The drop of hit ratio is explained by the spike of remote initial accesses.

Figure 23:
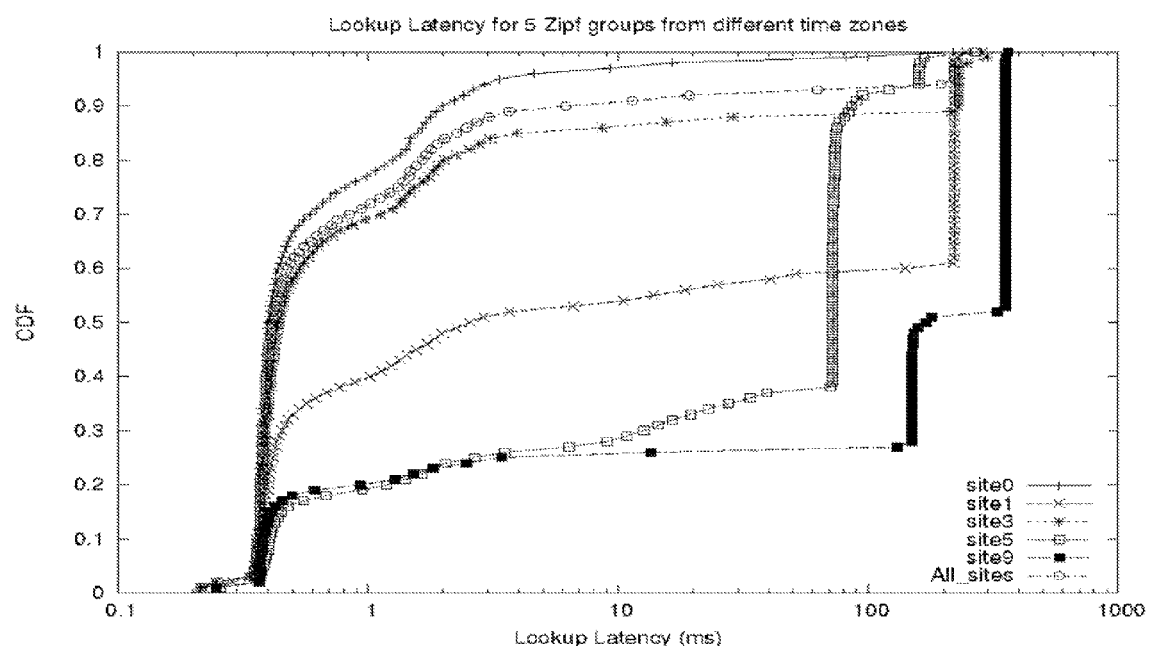
FIG. 23 is a graph showing latency CDF of the sites in Zipf grouping in a system used in evaluating the present invention.
Figure 24:
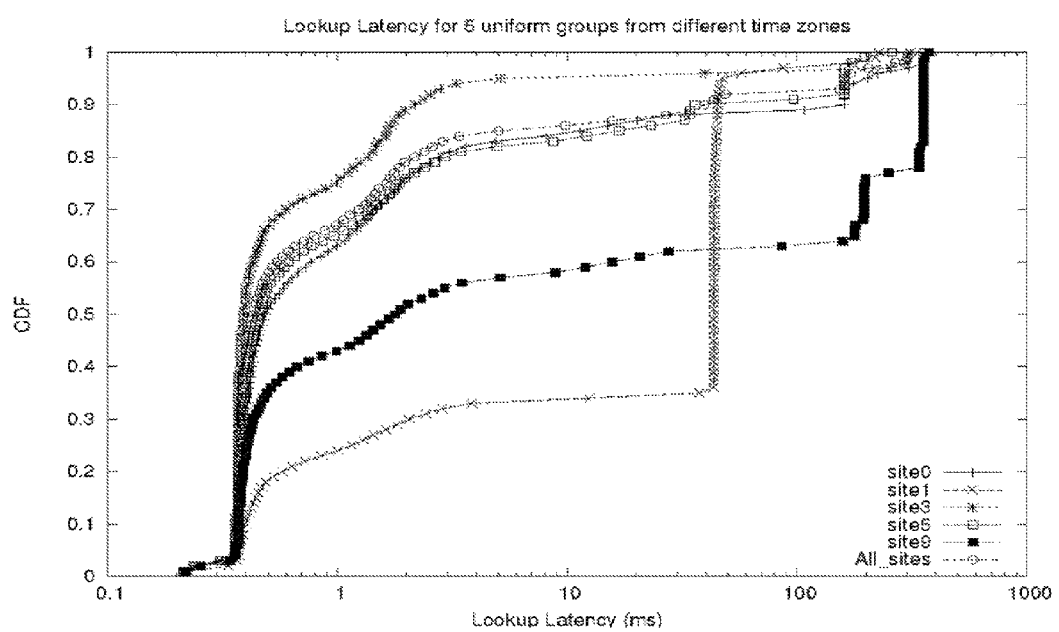
FIG. 24 is a graph showing latency CDF of the sites in uniform grouping in a system used in evaluating the present invention.

From other experiments the inventors have further determined that a) the frequency at which home assignment procedure is executed does not have a significant effect on the performance for the file access trace considered; b) a migration table size of 5K to 15K is sufficient to provide an almost comparable level of performance in terms of lookup latency (difference less than 4 ms) as the unconstrained case. Additionally, as demonstrated by a comparison of the latency/CDF plots of FIGS. 23 and 24, the proposed system performs better in terms look up latency in case of Zipf group distribution compared to case of uniform group distribution.

Data File Management

In this section, three schemes for WFSC cache management are compared: (1) a global LRU scheme wherein the cache disks are managed as a single LRU queue through a centralized server; (2) a distributed LRU scheme wherein the cache disks are managed as a distributed LRU queue by the distributed LRU algorithm of the invention described above; and (3) an independent LRU scheme wherein each cache disk is managed as a LRU queue by its WFSR independently.

Two metrics were chosen in performance measurement: (1) A hit ratio which, in a global LRU or distributed LRU, is the percentage that a requested file is currently cached in the "single" LRU queue. In an independent LRU, the hit ratio is the percentage that a requested file from a group is currently cached in the local LRU queue. (2) A data transfer amount, which is the amount of data to be transferred from the central server when a data request is missed in the target LRU queue.

The simulations were run on one-week traces from the Harvard data set. As in the metadata management simulations, all 75 hosts were mapped into 10 groups and the schemes were tested on both uniform and Zipf mapping distributions. Additionally, the overall cache disk size was varied from 32 GB to 1 TB. Two distributions were tested on individual disk size allocation for the 10 WFSRs: uniform and proportional to the number of hosts assigned to the local island. Hereinafter are presented results on uniform host-to-group mapping and uniform disk allocation.

Figure 25:
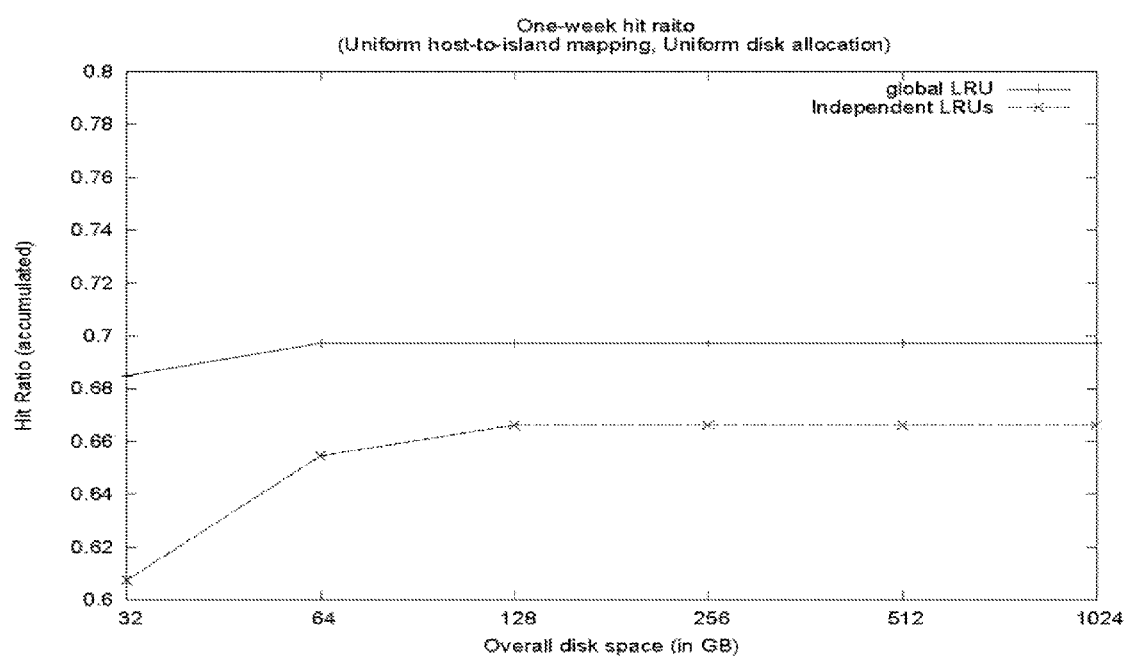
FIG. 25 is a graph showing hit ratio of global LRU and independent LRU's.
Figure 26:
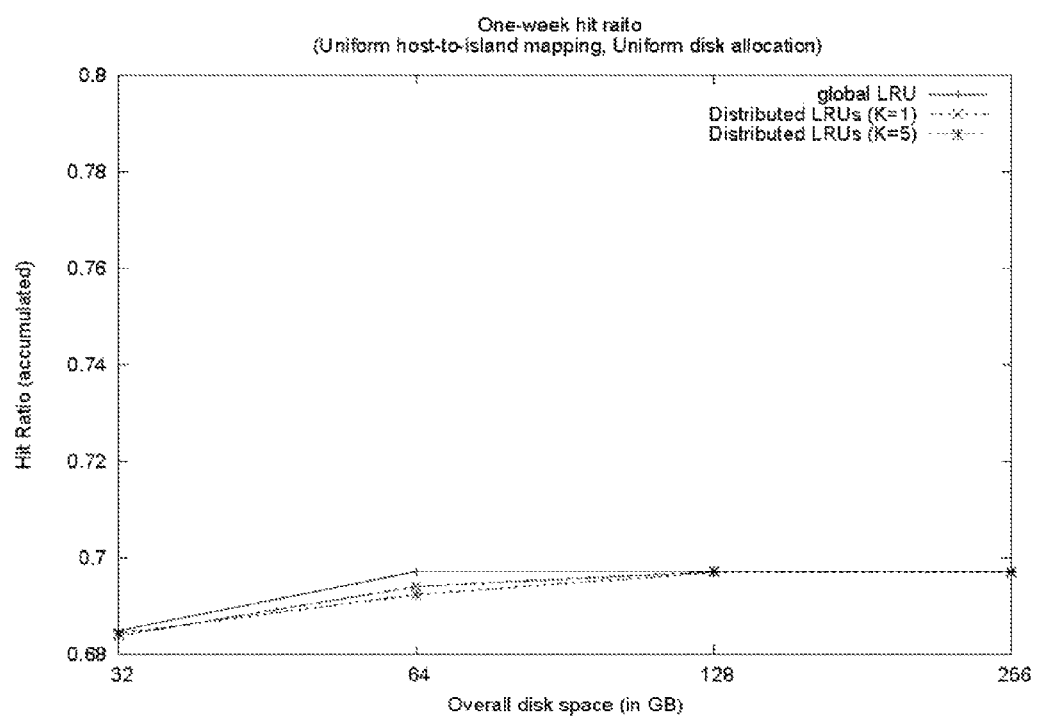
FIG. 26 is a graph showing data transfer demand on the central server of global LRU and independent LRU's.

FIGS. 25 and 26 show a performance comparison of global LRU and independent LRUs. To allow whole-file caching for all data requests, the overall disk space was started at 32 GB because there were single files in the traces with sizes close to 2 GB and a small overall disk space could make whole-file caching impossible for those files at some independent LRU disks. The x-axis is stopped at 256 GB because the performance of all schemes didn't change with larger disk space. That is due to the relatively small file set seen during the one-week traces (the total size of all distinct files during the time were slightly more than 32 GB).

It is not surprising that the global LRU scheme only outperformed the independent LRU scheme marginally when most of the disks were still under utilized. Actually, the constant hit ratio difference beyond 128 GB disk space was caused by the first-time accesses on the shared files accessed by multiple groups, which were counted "missing" once in global LRU but multiple times in independent LRU. But when the disk spaces were closer to full utilization (i.e., to the left in the figures), the advantage of the global LRU over independent LRU quickly became more obvious, especially in terms of the data transfer demand on the central server.

Figure 27:
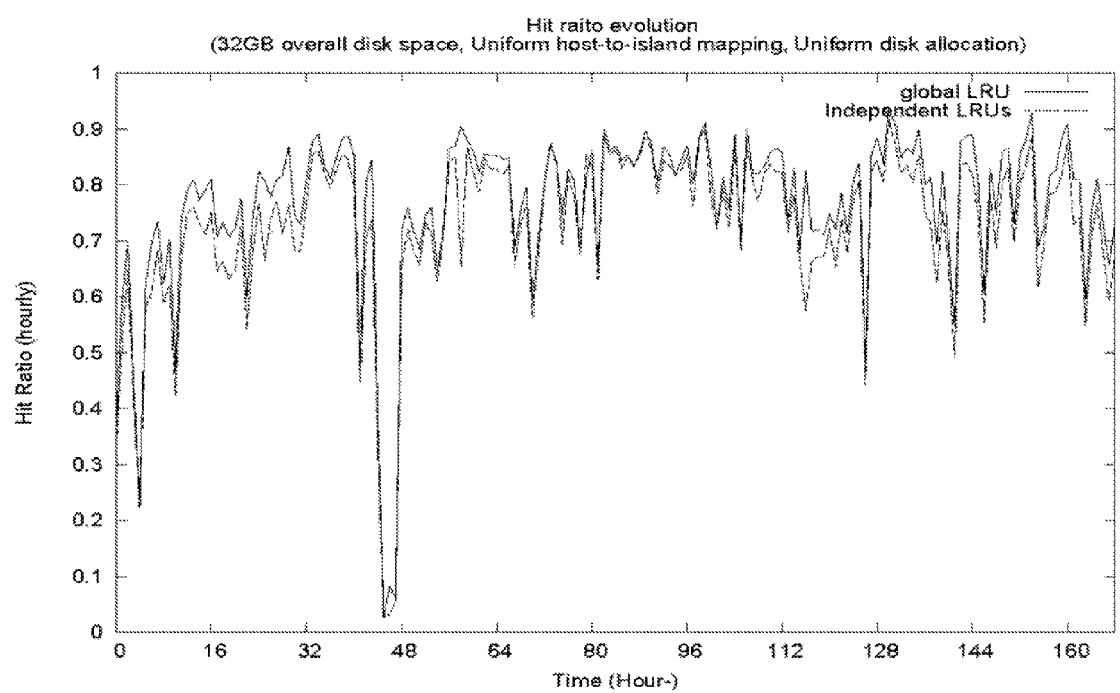
FIG. 27 is a graph showing the hourly hit ratio of global LRU and independent LRU's.
Figure 28:
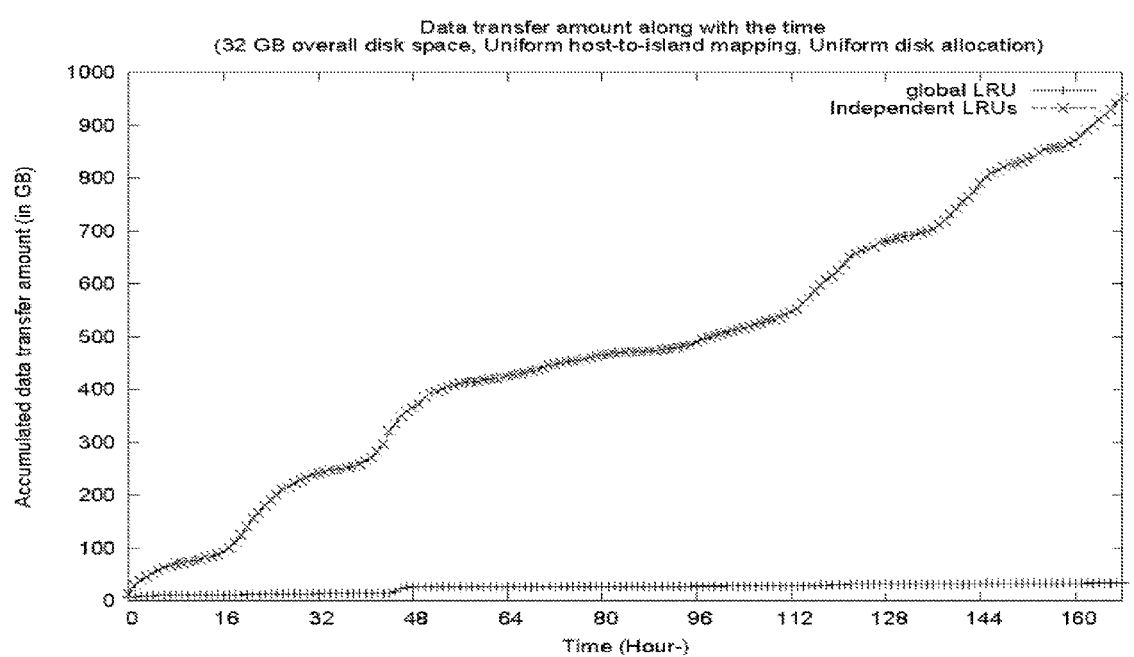
FIG. 28 is a graph showing the accumulated data transfer demand on the central server of global LRU and independent LRU's.

FIGS. 27 and 28 show the performance evolution of global LRU and independent LRU under fully-utilized 32 GB disk space. It can be seen that the hourly hit ratio difference between global LRU and independent LRU is more obvious than the accumulated hit ratio shown in the plot of FIG. 25. The data transfer demand from independent LRU keeps increasing rapidly while that from global LRU remains moderate.

Figure 29:
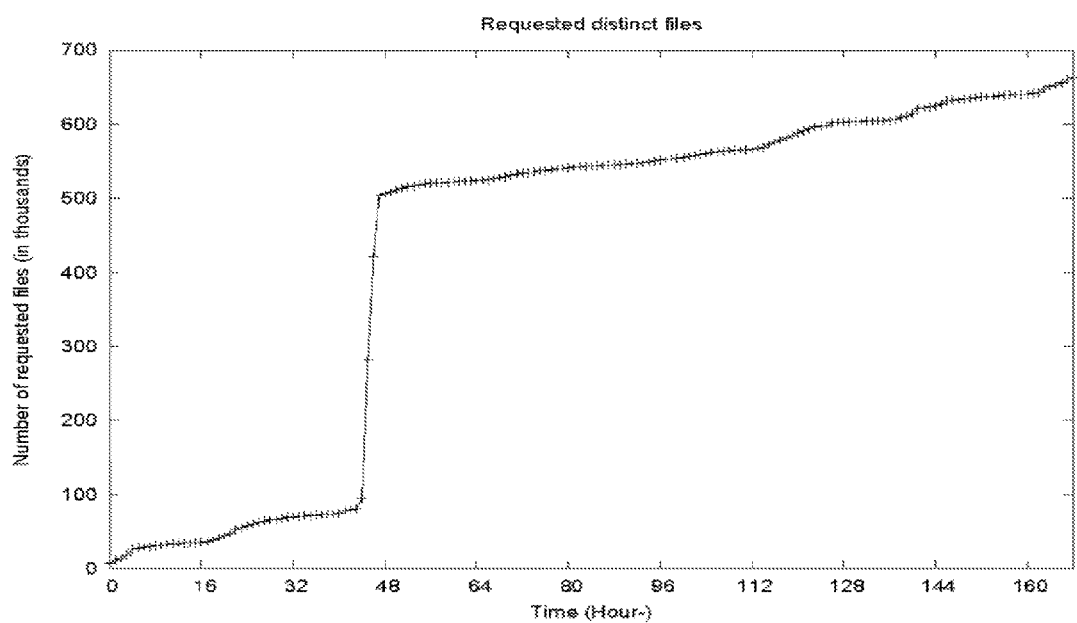
FIG. 29 is a graph showing the number of distinct requested files over time in a system used in evaluating the present invention.
Figure 30:
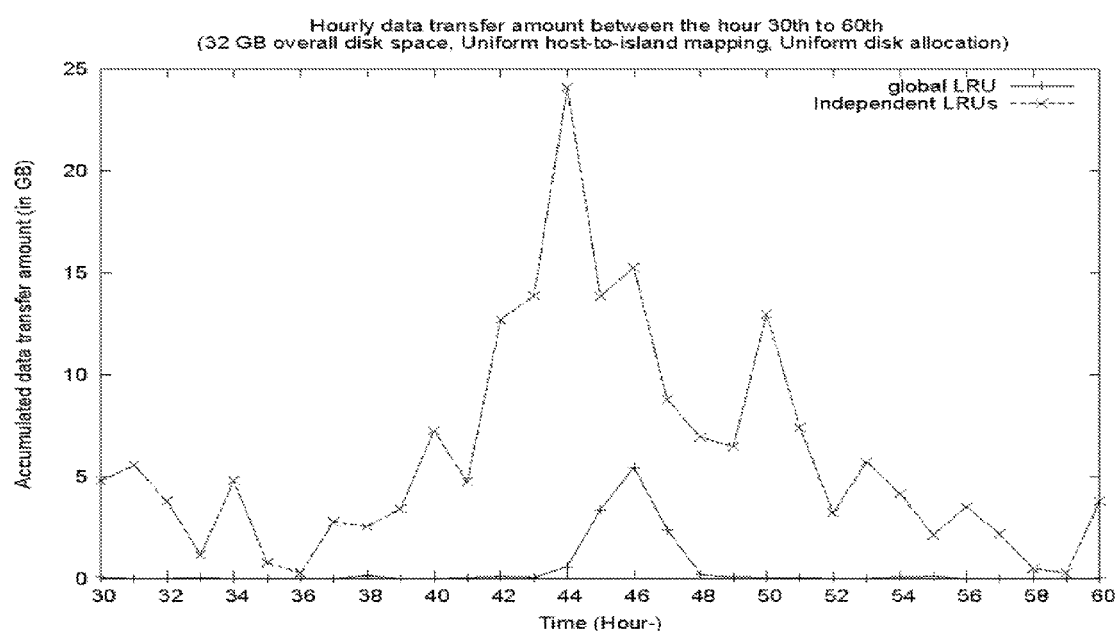
FIG. 30 is a graph showing the hourly data transfer demand on the central server of global LRU and independent LRU's.

The plot of FIG. 27 shows that during the hours 44 to 48 both schemes dropped the hit ratio close to 0, which was due to a bursty traffic of first-time file accesses, as shown in FIG. 29. The data transfer demand on the central server by the global LRU, however, is significantly lower than that by independent LRU during those "rush hours." The plot of FIG. 30 shows a zoom-in look on the hourly data transfer amount of the two schemes during that period. This clearly shows the advantage of a global LRU in alleviating the hot-spot problem when bursty data file requests are sent to the central server.

Figure 31:
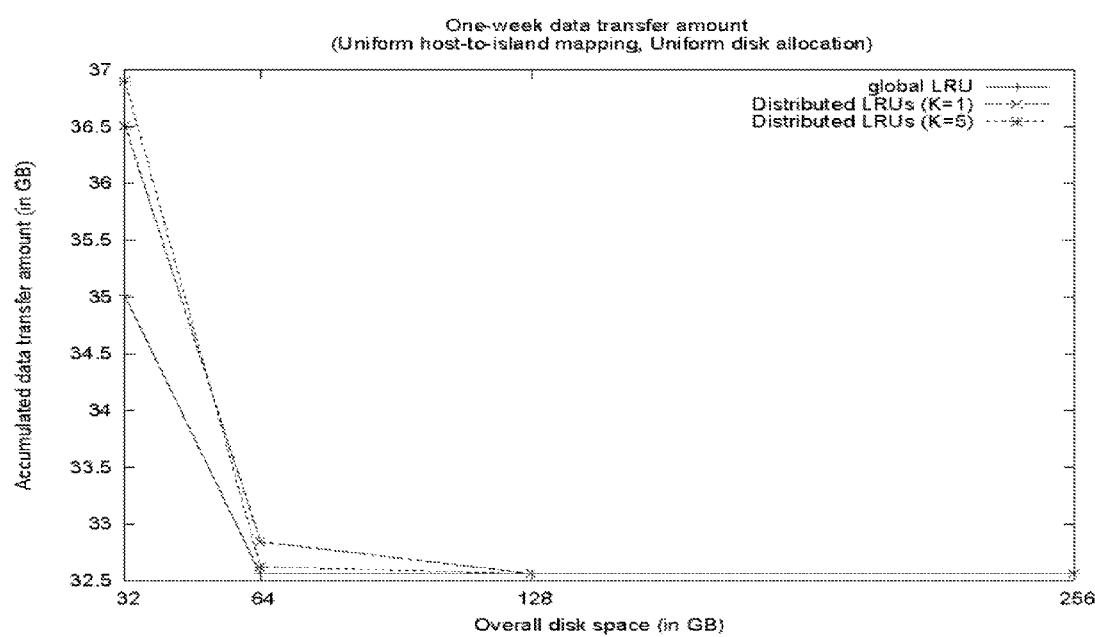
FIG. 31 is a graph showing the weekly hit ratio of global LRU and distributed LRU's.
Figure 32:
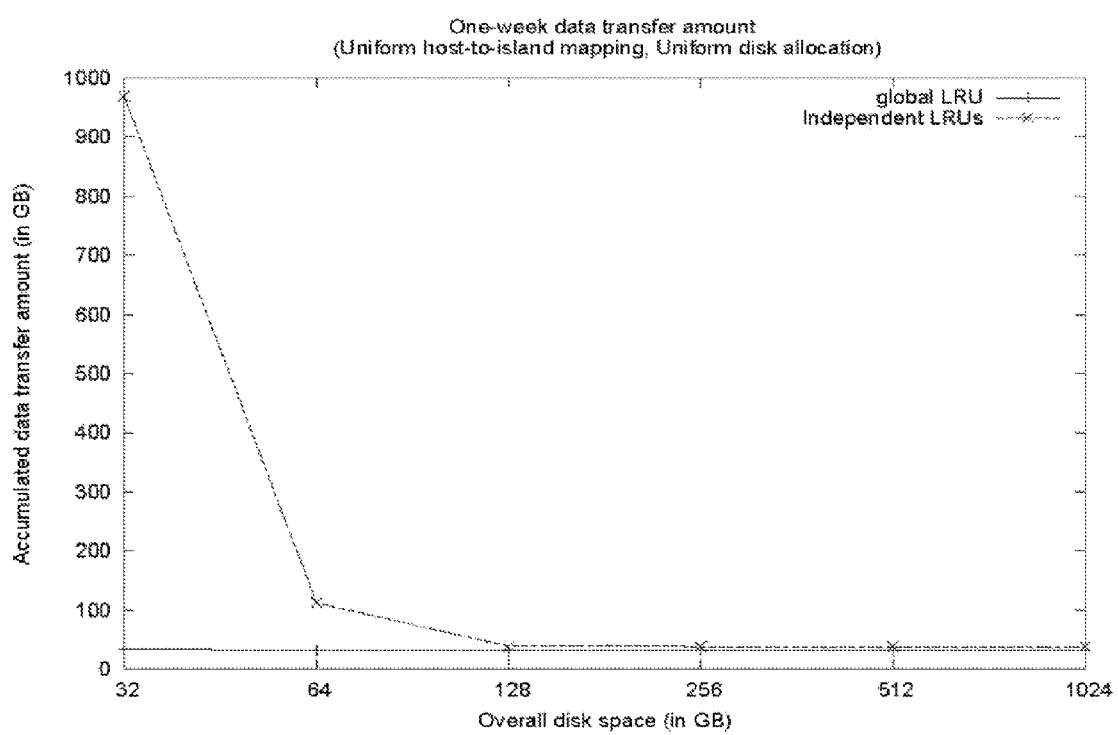
FIG. 32 is a graph showing the weekly data transfer demand on the central server of global LRU and distributed LRU's.
Figure 33:
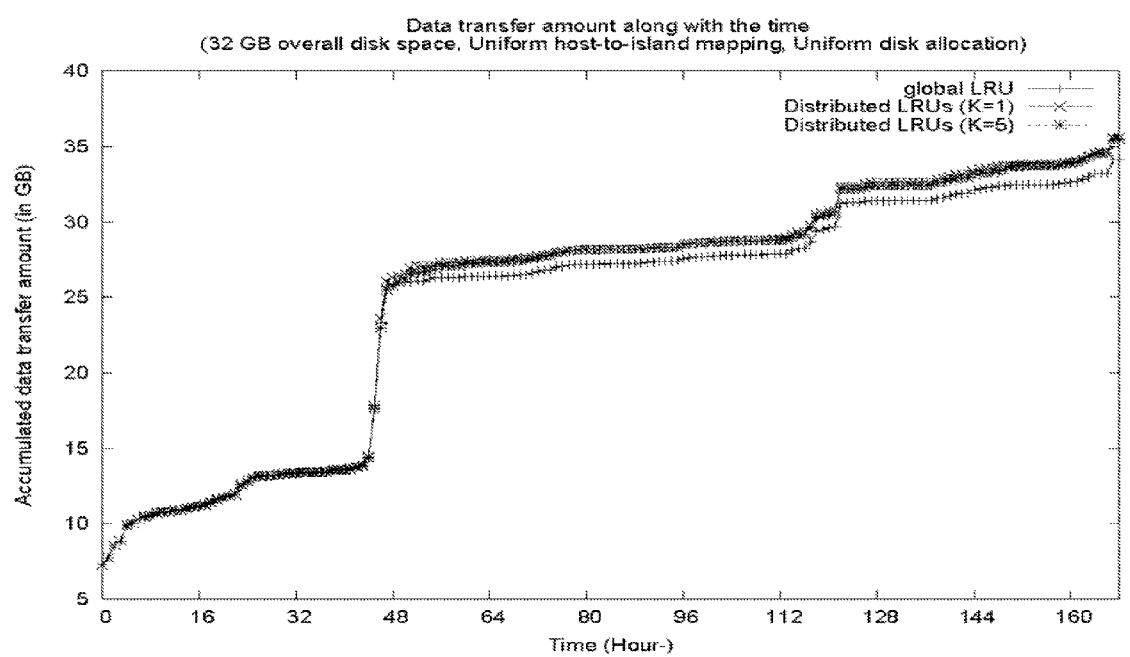
FIG. 33 is a graph showing the accumulated data transfer demand on the central server of global LRU and distributed LRU's.

FIGS. 31-33 show the performance comparison of the global LRU scheme and the distributed LRU scheme of the invention (K=1 and K=5). Clearly, distributed LRU performed closely to global LRU in terms of both hit ratio and data transfer amount; but distributed LRU achieved that without the global information implicitly required in a global LRU scheme. Besides, distributed LRU with K=5 explicitly enables parallel downloading of a single file from (up to) 5 sites for fast data replication.

Discussion

Consistency

WireFS extends the consistency semantics of network file systems over a wide area network. Since WireFS is file system agnostic, the consistency mechanism within a LAN must be enforced by the underlying file system. The inventors build a consistency mechanism over NFSv3. That is done for three main reasons: (i) NFS is a widely deployed protocol and the consistency afforded by NFS to its client is acceptable for most applications and users; (ii) NFS provides a close to open consistency model which is amenable to extensions over the wide area; and (iii) any stronger consistency semantics can be built on top of the system designed for NFS.

The inconsistency problem is handled using two techniques. First, all updates to a file are serialized at its home and only the owner is allowed to perform any updates. It is therefore enough for WireFS home to invalidate all other cached copies and redirect any new requests to the owner. Second, whole files are cached at the home node and the file is updated at the file server atomically. The home node collects all updates and creates a temporary file at the server. That file contains the original contents of the file and all updates are performed on it. At the end of the updates, the WFSM swaps the original and temporary files, which presents an atomic update at the file server.

While acquiring the ownership and invalidating cached copies may seem to be a slow process, typically updates are made to data not shared concurrently over the wide area network. End-user directories are most likely to see updates. Since accesses to such files are rarely shared, the ownership, once acquired, is never relinquished and updates can be performed without any messages over the WAN. Any additional consistency mechanisms which require stronger semantics may be built using locking and strict ordering, version reconciliation, etc.

Fault Tolerance

An important issue with meta-data requests is the role of the file server. Ensuring that the updates are visible only after they are applied to the file server enables strong consistency semantics, but introduces a single point of failure and at least one additional network round trip. The overheads can be mitigated by exposing the updates as soon as they are applied at the home. It also enables the system to eliminate redundant operations, such as create, write, delete cycles, common during compilation. However, there is a time window when the home node can crash or be inaccessible and a new client is provided with stale (inconsistent) information.

Primary-backup schemes should be used where updates are applied to primary and secondary homes before being made visible. That avoids the server being the single point of failure, while ensuring multiple copies of the updates being available to the system. Such a replication scheme would also lead to load balancing across the system while providing geographic separation. Finally, with the above, the file server can be used as a backup server which is not involved in the critical path of any request.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. In a wide area network having a central file manager and proxy nodes with the central file manager storing files of system data and metadata and the proxy nodes being assigned as one of a home node and a redirector node, the central file manager assigning home nodes ownership of respective ones of the files and the redirector nodes being proxy nodes that are not home nodes, a method for assigning and selecting the proxy nodes over the wide area network comprising the steps of:

partitioning a file system's namespace tree into closely related sets of the files;
   assigning the sets of files to proxy nodes as home nodes such that a request from a client behind the proxy nodes is satisfied by a local said proxy node with high probability, said assigning creating a lookup table, with a limited size, of the files and their respective home nodes by:
   a) allocating each directory node of at least a subset of the namespace tree to a respective proxy node having the lowest access cost among the proxy nodes for the respective directory node, wherein the access cost is dependent on an estimate of a number of accesses of each proxy node on the respective directory node within a next time interval and on latencies between the proxy node allocated to the respective directory node and each other proxy node,
   b) weighting each allocation with a weight cost that is based on the corresponding access cost of the respectively allocated proxy node, and
   c) selecting proxy nodes for insertion into said lookup table for corresponding directory nodes allocated to the proxy nodes such that proxy nodes having lowest weight costs are ensured placement in said lookup table and an directory nodes that are not included in said lookup table when filled are assigned the proxy node of a corresponding, assigned parent directory node; and
   updating the lookup table each time it is modified by successive assigning steps.

2. The method of claim 1, wherein the step of assigning further comprises:
   selecting a new proxy node as a home node based on redirector node's frequency of access of the file over a certain time interval.

3. The method of claim 1, wherein the closely related sets of files are further based on network latencies between redirector nodes and a directory node of the file.

4. The method of claim 1, wherein the lookup table is administered by the central file manager, and wherein the assigning step further comprises the following steps performed by the central file manager:
   starting from a root directory node in a file directory tree, deciding a home node for each directory node a based on redirectors' total access frequency to a subtree rooted at a;
   for a home node assignment order, following breadth-first searching on the directory tree, and using a dynamic process to pick an optimal assignment solution.

5. The method of claim 1, wherein the assigning is performed by the central file manager and
   wherein said allocating includes creating for each directory node ($D_x$) in the namespace tree, a stack of n registers $\{C_{D_x,R_i,R}; i \in [0, n]\}$ recording the expected access times of each proxy node on $D_x$ during the next time interval to determine the estimate, wherein $R_i$ is a given proxy node;
   wherein the proxy node having the lowest access cost among the proxy nodes for a respective directory node $D_x$ is $H(D_x)$, and wherein the weight cost ($W(D_x)$) for $D_x$ is $(\Sigma_{j=0}^{n} C_{D_x,R_j} L_{R_j,H(D_x)} + M_{D_x,H(D_x)})$, wherein $L_{R_j,H(D_x)}$ is a network latency between $R_j$ and $H(D_x)$, and $M_{D_x,H(D_x)}$ is a transfer cost of migrating $D_x$ from a current home node to $H(D_x)$;
   wherein the selecting further comprises:
   (i) initializing the lookup table with one entry recording a home node $R_0$ for the root directory;
   (ii) placing all directory nodes into an ordered list in accordance with weight cost $W(D_x)$; and
   (iii) repeating the following steps until either all lookup table entries are filled or the ordered list is empty:
   removing a head node in the ordered list, placing the head node into the lookup table and assigning the head node to $H(D_x)$, the placing and assigning the head node being performed only if a closest parent node of the head node in the lookup table is not assigned to a same home node as $H(D_x)$;
   if a new node $D_x$ is put into the migration table, removing an immediate successor node of new node $D_x$ in the lookup table if the successor node's assigned home node is the same as $H(D_x)$.

6. The method of claim 1, wherein the assigning step further comprises:
   transferring meta-data and home node functions of the file to the new home node based on the lookup table of the central file manger.

* * * * *